(12) United States Patent
Liu et al.

(10) Patent No.: US 12,177,051 B2
(45) Date of Patent: Dec. 24, 2024

(54) COMMON FREQUENCY RESOURCES FOR DIFFERENT NUMEROLOGIES

(71) Applicant: QUALCOMM Incorporated, San Diego, CA (US)

(72) Inventors: Le Liu, Fremont, CA (US); Alberto Rico Alvarino, San Diego, CA (US); Kazuki Takeda, Tokyo (JP); Mostafa Khoshnevisan, San Diego, CA (US); Prasad Reddy Kadiri, San Diego, CA (US); Xipeng Zhu, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 367 days.

(21) Appl. No.: 17/449,504

(22) Filed: Sep. 30, 2021

(65) Prior Publication Data

US 2023/0096426 A1   Mar. 30, 2023

(51) Int. Cl.
*H04L 27/26* (2006.01)
*H04W 72/044* (2023.01)
(Continued)

(52) U.S. Cl.
CPC .... *H04L 27/26025* (2021.01); *H04L 27/2607* (2013.01); *H04W 72/044* (2013.01); *H04W 72/1263* (2013.01); *H04W 72/30* (2023.01)

(58) Field of Classification Search
CPC ......... H04L 27/26025; H04L 27/2607; H04W 72/044; H04W 72/1263; H04W 72/30
See application file for complete search history.

(56) References Cited

U.S. PATENT DOCUMENTS

| | | | |
|---|---|---|---|
| 10,700,837 B2 * | 6/2020 | Abdoli | H04W 72/0446 |
| 2022/0286818 A1 * | 9/2022 | Chin | H04W 24/08 |

(Continued)

FOREIGN PATENT DOCUMENTS

WO   WO-2022236725 A1 *  11/2022

OTHER PUBLICATIONS

International Search Report and Written Opinion—PCT/US2022/045230—ISA/EPO—Feb. 7, 2023.

(Continued)

*Primary Examiner* — Chae S Lee
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of a first common frequency resource (CFR) within a bandwidth part (BWP) and a second CFR within the BWP. Accordingly, the UE may receive, using a first numerology, a non-group-common communication at least partially in the BWP. The UE may also receive, using the first numerology, a group-common communication at least partially in the first CFR, and receive, using a second numerology, a group-common communication at least partially in the second CFR. As an alternative, the UE may receive an indication of a CFR within a BWP. Accordingly, the UE may receive, using a first numerology, a non-group-common communication in the BWP and a first group-common communication in the CFR, and receive, using a second numerology, a second group-common communication in the CFR. Numerous other aspects are described.

30 Claims, 14 Drawing Sheets

(51) Int. Cl.
 *H04W 72/1263* (2023.01)
 *H04W 72/30* (2023.01)

(56) References Cited

U.S. PATENT DOCUMENTS

| | | | | |
|---|---|---|---|---|
| 2022/0321281 A1* | 10/2022 | Yao | ............... | H04W 4/70 |
| 2022/0360360 A1* | 11/2022 | Awadin | ............... | H04W 8/24 |
| 2023/0164807 A1* | 5/2023 | Lee | ............... | H04W 72/00 |
| | | | | 370/329 |
| 2023/0199739 A1* | 6/2023 | Zhou | ............... | H04W 72/232 |
| | | | | 370/329 |

OTHER PUBLICATIONS

Moderator (CMCC) : "Summary#8 on mechanisms to support group scheduling for RRC_CONNECTED UEs for NR MBS", 3GPP TSG RAN WG1 #104-e, R1-2102032, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, 179 Pages, Feb. 5, 2021, XP051977657, Sect. 2.7, p. 38, p. 42, p. 45.

Moderator (CMCC): "Summary#1 on Mechanisms to Support Group Scheduling for RRC_CONNECTED UEs for NR MBS", 3GPP TSG RAN WG1 #104-e, R1-2102099, 3rd Generation Partnership Project, Mobile Competence Centre, 650, Route Des Lucioles, F-06921 Sophia-Antipolis Cedex, France , vol. RAN WG1, No. e-Meeting, Jan. 25, 2021-Feb. 5, 2021, 194 Pages, Feb. 4, 2021, XP051976086, Sect. 1, p. 1, Sect. 2.7, p. 42, Sect. 2. 8, p. 43.

* cited by examiner

COMMON FREQUENCY RESOURCES FOR DIFFERENT NUMEROLOGIES

FIELD OF THE DISCLOSURE

Aspects of the present disclosure generally relate to wireless communication and to techniques and apparatuses for configuring common frequency resources for different numerologies.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a base station, an indication of a first common frequency resource (CFR) within a bandwidth part (BWP) and a second CFR for multicast/broadcast service (MBS) within the BWP. The method may further include receiving, using a first numerology, a non-group-common communication at least partially in the BWP. The method may include receiving, using the first numerology, a group-common communication at least partially in the first CFR. The method may further include receiving, using a second numerology, a group-common communication at least partially in the second CFR.

Some aspects described herein relate to a method of wireless communication performed by a UE. The method may include receiving, from a base station, an indication of a CFR within a BWP. The method may further include receiving, using a first numerology, a non-group-common communication in the BWP. The method may include receiving, using the first numerology, a first group-common communication in the CFR. The method may further include receiving, using a second numerology, a second group-common communication in the CFR.

Some aspects described herein relate to a method of wireless communication performed by a base station. The method may include transmitting, to a UE, an indication of a first CFR within a BWP and a second CFR for MBS within the BWP. The method may further include transmitting, using a first numerology, a non-group-common communication at least partially in the BWP. The method may include transmitting, using the first numerology, a group-common communication at least partially in the first CFR. The method may further include transmitting, using a second numerology, a group-common communication at least partially in the second CFR.

Some aspects described herein relate to a method of wireless communication performed by a base station. The method may include transmitting, to a UE, an indication of a CFR within a BWP. The method may further include transmitting, using a first numerology, a non-group-common communication in the BWP. The method may include transmitting, using the first numerology, a first group-common communication in the CFR. The method may further include transmitting, using a second numerology, a second group-common communication in the CFR.

Some aspects described herein relate to an apparatus for wireless communication at a UE. The apparatus may include a memory and one or more processors coupled to the memory. The one or more processors may be configured to receive, from a base station, an indication of a first CFR within a BWP and a second CFR for MBS within the BWP. The one or more processors may be further configured to receive, using a first numerology, a non-group-common communication at least partially in the BWP. The one or more processors may be configured to receive, using the first numerology, a group-common communication at least partially in the first CFR. The one or more processors may be further configured to receive, using a second numerology, a group-common communication at least partially in the second CFR.

Some aspects described herein relate to an apparatus for wireless communication at a UE. The apparatus may include a memory and one or more processors coupled to the memory. The one or more processors may be configured to receive, from a base station, an indication of a CFR within a BWP. The one or more processors may be further configured to receive, using a first numerology, a non-group-common communication in the BWP. The one or more processors may be configured to receive, using the first numerology, a first group-common communication in the CFR. The one or more processors may be further configured to receive, using a second numerology, a second group-common communication in the CFR.

Some aspects described herein relate to an apparatus for wireless communication at a base station. The apparatus may include a memory and one or more processors coupled to the memory. The one or more processors may be configured to transmit, to a UE, an indication of a first CFR within a BWP and a second CFR for MBS within the BWP. The one or more processors may be further configured to transmit, using a first numerology, a non-group-common communication at least partially in the BWP. The one or more processors may be configured to transmit, using the first numerology, a group-common communication at least partially in the first CFR. The one or more processors may be further configured to transmit, using a second numerology, a group-common communication at least partially in the second CFR.

Some aspects described herein relate to an apparatus for wireless communication at a base station. The apparatus may include a memory and one or more processors coupled to the memory. The one or more processors may be configured to transmit, to a UE, an indication of a CFR within a BWP. The one or more processors may be further configured to transmit, using a first numerology, a non-group-common communication in the BWP. The one or more processors may be configured to transmit, using the first numerology, a first group-common communication in the CFR. The one or more processors may further be configured to transmit, using a second numerology, a second group-common communication in the CFR.

Some aspects described herein relate to a non-transitory computer-readable medium that stores a set of instructions for wireless communication by a UE. The set of instructions, when executed by one or more processors of the UE, may cause the UE to receive, from a base station, an indication of a first CFR within a BWP and a second CFR for MBS within the BWP. The set of instructions, when executed by one or more processors of the UE, may further cause the UE to receive, using a first numerology, a non-group-common communication at least partially in the BWP. The set of instructions, when executed by one or more processors of the UE, may cause the UE to receive, using the first numerology, a group-common communication at least partially in the first CFR. The set of instructions, when executed by one or more processors of the UE, may further cause the UE to receive, using a second numerology, a group-common communication at least partially in the second CFR.

Some aspects described herein relate to a non-transitory computer-readable medium that stores a set of instructions for wireless communication by a UE. The set of instructions, when executed by one or more processors of the UE, may cause the UE to receive, from a base station, an indication of a CFR within a BWP. The set of instructions, when executed by one or more processors of the UE, may further cause the UE to receive, using a first numerology, a non-group-common communication in the BWP. The set of instructions, when executed by one or more processors of the UE, may cause the UE to receive, using the first numerology, a first group-common communication in the CFR. The set of instructions, when executed by one or more processors of the UE, may further cause the UE to receive, using a second numerology, a second group-common communication in the CFR.

Some aspects described herein relate to a non-transitory computer-readable medium that stores a set of instructions for wireless communication by a base station. The set of instructions, when executed by one or more processors of the base station, may cause the base station to transmit, to a UE, an indication of a first CFR within a BWP and a second CFR for MBS within the BWP. The set of instructions, when executed by one or more processors of the base station, may further cause the base station to transmit, using a first numerology, a non-group-common communication at least partially in the BWP. The set of instructions, when executed by one or more processors of the base station, may cause the base station to transmit, using the first numerology, a group-common communication at least partially in the first CFR. The set of instructions, when executed by one or more processors of the base station, may further cause the base station to transmit, using a second numerology, a group-common communication at least partially in the second CFR.

Some aspects described herein relate to a non-transitory computer-readable medium that stores a set of instructions for wireless communication by a base station. The set of instructions, when executed by one or more processors of the base station, may cause the base station to transmit, to a UE, an indication of a CFR within a BWP. The set of instructions, when executed by one or more processors of the base station, may further cause the base station to transmit, using a first numerology, a non-group-common communication in the BWP. The set of instructions, when executed by one or more processors of the base station, may cause the base station to transmit, using the first numerology, a first group-common communication in the CFR. The set of instructions, when executed by one or more processors of the base station, may further cause the base station to transmit, using a second numerology, a second group-common communication in the CFR.

Some aspects described herein relate to an apparatus for wireless communication. The apparatus may include means for receiving, from a base station, an indication of a first CFR within a BWP and a second CFR for MBS within the BWP. The apparatus may further include means for receiving, using a first numerology, a non-group-common communication at least partially in the BWP. The apparatus may include means for receiving, using the first numerology, a group-common communication at least partially in the first CFR. The apparatus may further include means for receiving, using a second numerology, a group-common communication at least partially in the second CFR.

Some aspects described herein relate to an apparatus for wireless communication. The apparatus may include means for receiving, from a base station, an indication of a CFR within a BWP. The apparatus may further include means for receiving, using a first numerology, a non-group-common communication in the BWP. The apparatus may include means for receiving, using the first numerology, a first group-common communication in the CFR. The apparatus may further include means for receiving, using a second numerology, a second group-common communication in the CFR.

Some aspects described herein relate to an apparatus for wireless communication. The apparatus may include means for transmitting, to a UE, an indication of a first CFR within a BWP and a second CFR for MBS within the BWP. The apparatus may further include means for transmitting, using a first numerology, a non-group-common communication at least partially in the BWP. The apparatus may include means for transmitting, using the first numerology, a group-common communication at least partially in the first CFR. The apparatus may further include means for transmitting, using a second numerology, a group-common communication at least partially in the second CFR.

Some aspects described herein relate to an apparatus for wireless communication. The apparatus may include means for transmitting, to a UE, an indication of a CFR within a BWP. The apparatus may further include means for transmitting, using a first numerology, a non-group-common communication in the BWP. The apparatus may include means for transmitting, using the first numerology, a first group-common communication in the CFR. The apparatus may further include means for transmitting, using a second numerology, a second group-common communication in the CFR.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
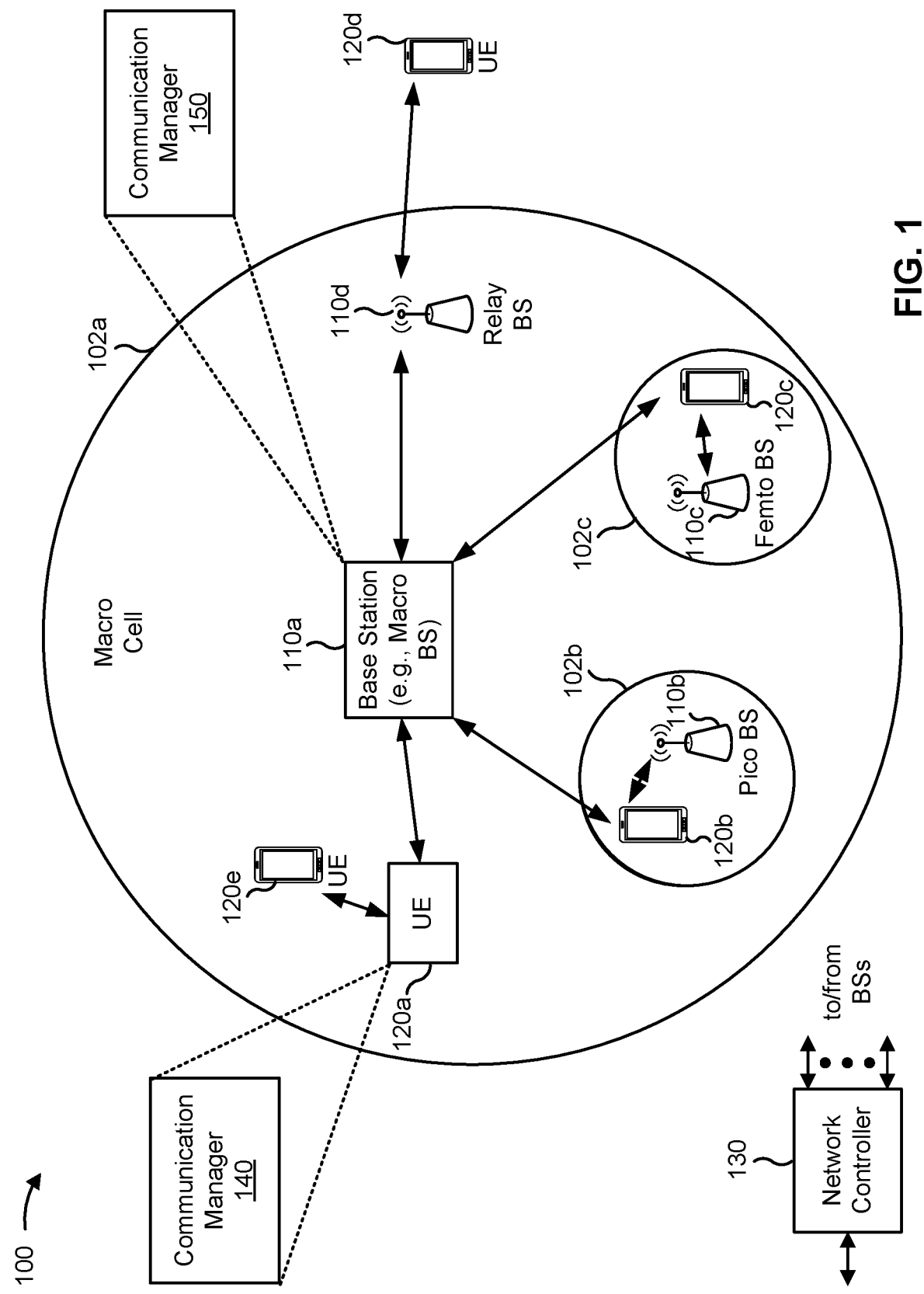
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive (e.g., from the base station 110) an indication of a first common frequency resource (CFR) within a bandwidth part (BWP) and a second CFR for multicast/broadcast service (MBS) within the BWP; receive, using a first numerology, a non-group-common communication at least partially in the BWP; receive, using the first numerology, a group-common communication at least partially in the first CFR; and receive, using a second numerology, a group-common communication at least partially in the second CFR. As an alternative, the communication manager 140 may receive (e.g., from the base station 110) an indication of a CFR within a BWP; receive, using a first numerology, a non-group-common communication in the BWP; receive, using the first numerology, a first group-common communication in the CFR; and receive, using a second numerology, a second group-common communication in the CFR. Additionally, or alternatively, the communication manager 140 may perform one or more other operations described herein.

In some aspects, the base station 110 may include a communication manager 150. As described in more detail elsewhere herein, the communication manager 150 may transmit (e.g., to the UE 120) an indication of a first CFR within a BWP and a second CFR for MBS within the BWP; transmit, using a first numerology, a non-group-common communication at least partially in the BWP; transmit, using the first numerology, a group-common communication at least partially in the first CFR; and transmit, using a second numerology, a group-common communication at least partially in the second CFR. As an alternative, the communication manager 150 may transmit (e.g., to the UE 120) an indication of a CFR within a BWP; transmit, using a first numerology, a first group-common communication in the CFR; and transmit, using a second numerology, a second group-common communication in the CFR. Additionally, or alternatively, the communication manager 150 may perform one or more other operations described herein.

As indicated above, FIG. 1 is provided as an example. Other examples may differ from what is described with regard to FIG. 1.

Figure 2:
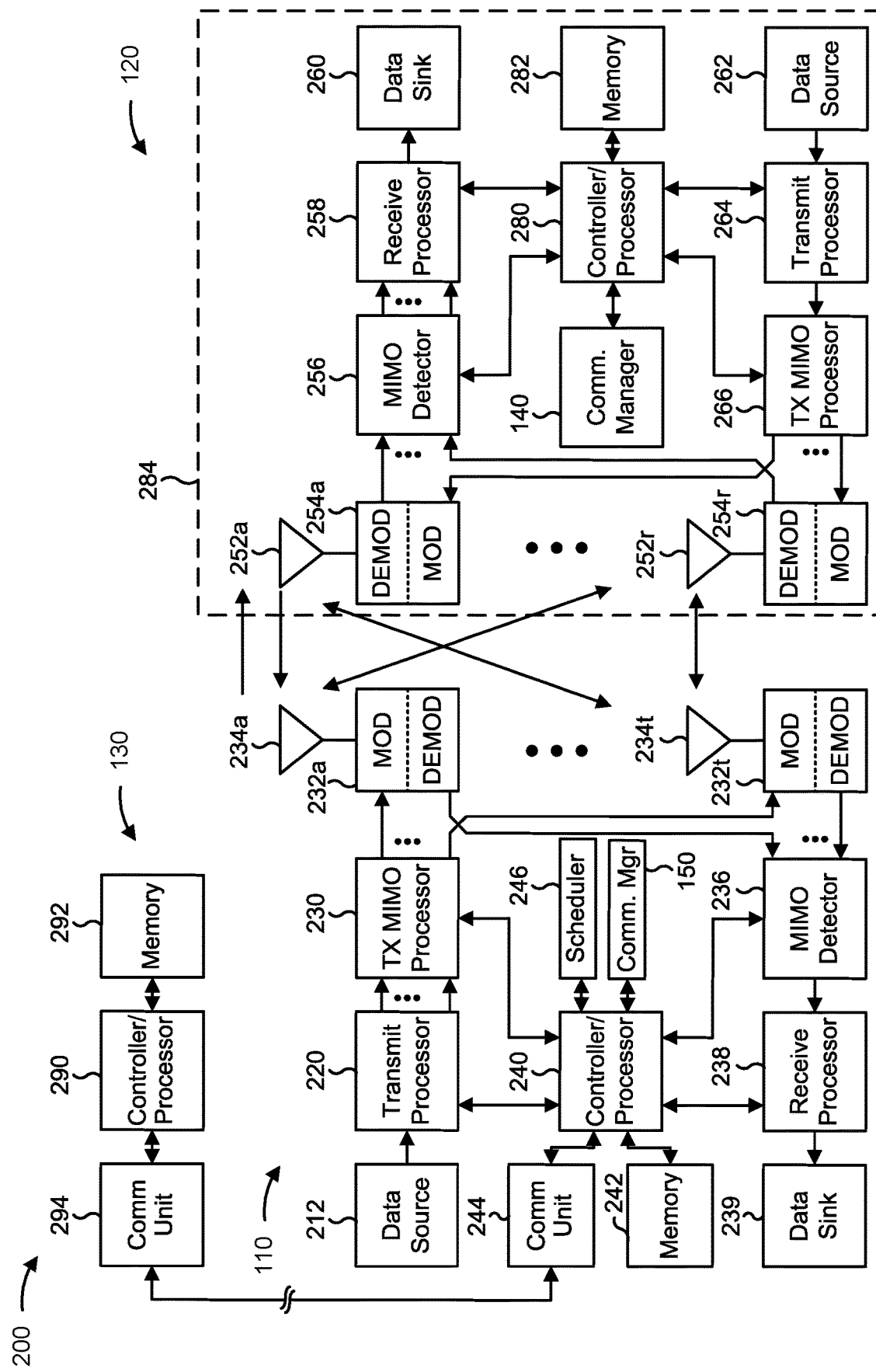
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-13).

The controller/processor 240 of the base station 110, the controller/processor 280 of the UE 120, and/or any other component(s) of FIG. 2 may perform one or more techniques associated with configuring CFRs for different numerologies, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a UE (e.g., the UE 120 and/or apparatus 1200 of FIG. 12) may include means for receiving, from a base station (e.g., the base station 110 and/or apparatus 1300 of FIG. 13), an indication of a first CFR within a BWP and a second CFR for MBS within the BWP; means for receiving, using a first numerology, a non-group-common communication at least partially in the BWP; means for receiving, using the first numerology, a group-common communication at least partially in the first CFR; and/or means for receiving, using a second numerology, a group-common communication at least partially in the second CFR. As an alternative, the UE may include means for receiving, from the base station, an indication of a CFR within a BWP; means for receiving, using a first numerology, a non-group-common communication in the BWP; means for receiving, using the first numerology, a first group-common communication in the CFR; and/or means for receiving, using a second numerology, a second group-common communication in the CFR. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station (e.g., the base station 110 and/or apparatus 1300 of FIG. 13) may include means for transmitting, to a UE (e.g., the UE 120 and/or apparatus 1200 of FIG. 12), an indication of a first CFR within a BWP and a second CFR for MBS within the BWP; means for transmitting, using a first numerology, a non-group-common communication at least partially in the BWP; means for transmitting, using the first numerology, a group-common communication at least partially in the first CFR; and/or means for transmitting, using a second numerology, a group-common communication at least partially in the second CFR. As an alternative, the base station may include means for transmitting, to the UE, an indication of a CFR within a BWP; means for transmitting, using a first numerology, a non-group-common communication in the BWP; means for transmitting, using the first numerology, a first group-common communication in the CFR; and/or means for transmitting, using a second numerology, a second group-common communication in the CFR. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

A network may configure a BWP for use by a UE. As used herein, "bandwidth part" or "BWP" refers to a contiguous set of physical resource blocks (PRBs), where each PRB includes a set of frequencies corresponding to one or more subcarriers. A "subcarrier" may refer to a frequency based at least in part on a "carrier" frequency, and subcarriers may be aggregated to convey information wirelessly (e.g., using OFDM symbols and/or other RF symbols). Generally, a BWP is configured for non-group-common communication, such as unicast communications or system information block (SIB) transmissions.

Within a BWP, the network may configure a CFR. As used herein, "common frequency resource" or "CFR" refers to a set of PRBs that at least partially overlaps the set of PRBs in a BWP associated with the CFR. The network may configure a CFR for group-common communications. For example, the network may configure a CFR for multicast communications using a PDCCH-Config data structure, a PDSCH-Config data structure, and/or an SPS-Config data structure (e.g., as defined in 3GPP specifications and/or another standard). Similarly, the network may configure a CFR for broadcast communications using a PDCCH-Config data structure and/or a PDSCH-Config data structure (e.g., as defined in 3GPP specifications and/or another standard).

In order to extend a range of some multicast and broadcast communications, a network may use a different numerology as compared with unicast communications and/or other multicast and broadcast communications. For example, the network may use a higher subcarrier spacing (SCS), such as 30 kHz, rather than 15 kHz. Additionally, or alternatively, the network may use an extended cyclic prefix (ECP), rather than a normal cyclic prefix (NCP). As used herein, "cyclic prefix" or "CP" refers to a repetition of an end of a symbol (e.g., an OFDM symbol) before a beginning of the symbol. In 5G, a length of the "normal cyclic prefix" or "NCP" may be calculated according to an expression of the form $144\kappa \cdot 2^{-\mu}$ or $144\kappa \cdot 2^{-\mu} + 16\kappa$, where $\kappa$ represents a time unit constant (e.g., often set to 64) and $\mu$ represents the SCS. Meanwhile, in 5G, a length of the "extended cyclic prefix" or "ECP" may be calculated according to an expression of the form $512\kappa \cdot 2^{-\mu}$.

Generally, however, the network cannot use different numerologies within a single BWP. However, this results in wasted spectrum because the network has to allocate more spectrum to assign different BWPs for different numerologies. As a result, interference between cells is more likely because more spectrum is reserved by the network within each cell, which wastes power and processing resources by increasing chances of retransmissions and dropped packets.

Some techniques and apparatuses described herein enable a base station (e.g., base station 110) to use different numerologies within a single BWP. For example, the base station 110 may allocate a first CFR for a first numerology and a second CFR for a second numerology in a BWP. As an alternative, the base station 110 may use multiple numerologies within a single CFR. As a result, the base station 110 conserves spectrum. Therefore, interference between cells is less likely because less spectrum is reserved, which conserves power and processing resources at the base station 110 and UEs served by the base station 110 (e.g., UE 120) by reducing chances of retransmissions and dropped packets.

Figure 3:
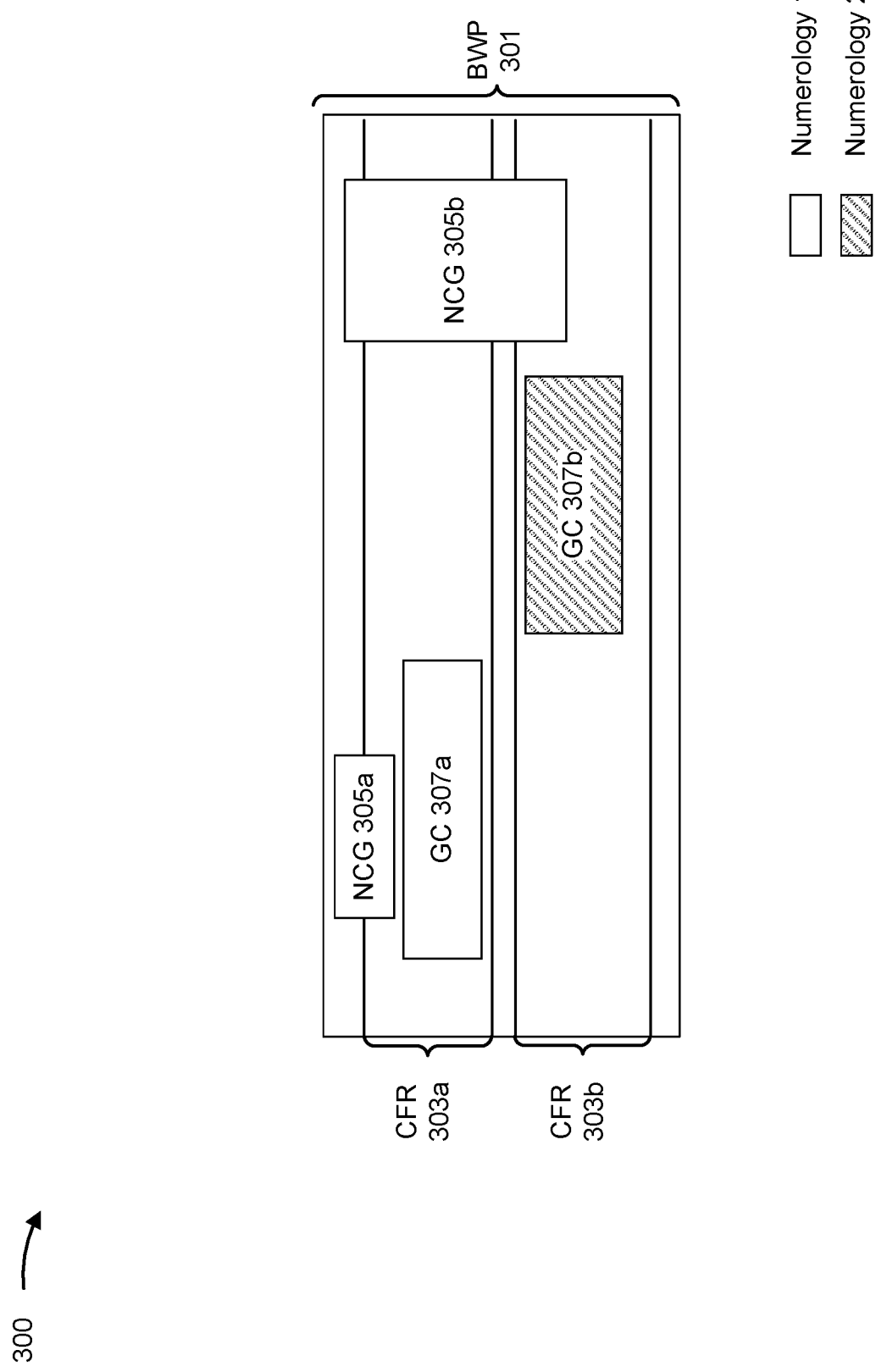
FIG. 3 is a diagram illustrating an example associated with using multiple common frequency resources (CFRs) for different numerologies, in accordance with the present disclosure.

FIG. 3 is a diagram illustrating an example 300 associated with using multiple CFRs for different numerologies, in accordance with the present disclosure. As shown in FIG. 3, example 300 includes a BWP 301 (e.g., configured by a base station 110 for use by a UE 120). As further shown in FIG. 3, the BWP 301 includes a first CFR 303*a* associated with a first numerology and a second CFR 303*b* associated with a second numerology. The second numerology may include a different SCS (e.g., 30 kHz instead of 15 kHz) and/or an ECP rather than an NCP in order to increase a range associated communications using the second numerology as compared with the first numerology. Although shown as within the BWP 301, the first CFR 303*a* and/or the second CFR 303*b* may, in some aspects, at least partially include frequency resources outside of the BWP 301. Additionally, or alternatively, although shown as separate in frequency, the first CFR 303a and the second CFR 303b may at least partially overlap in frequency.

As further shown in FIG. 3, the UE 120 may receive non-group-common (NGC) communications (e.g., unicast communications) at least partially within the BWP 301. For example, the UE 120 may receive NGC communication 305a at least partially within the BWP 301 and at least partially within the first CFR 303a. In another example, the UE 120 may receive NGC communication 305b at least partially within the first CFR 303a and overlapping with the second CFR 303b. The NGC communications may include scheduling information (e.g., received on a physical downlink control channel (PDCCH)) or data (e.g., received on a physical downlink shared channel (PDSCH) and scheduled by the scheduling information).

The UE 120 may further receive group-common (GC) communications (e.g., multicast and/or broadcast communications associated with an MBS) in the first CFR 303a using the first numerology or in the second CFR 303b using the second numerology. For example, the UE 120 may receive GC communication 307a within the first CFR 303a and may receive GC communication 307b within the second CFR 303b. The GC communications may include scheduling information (e.g., received on a group common PDCCH (GC-PDCCH)) or data (e.g., received on a group common PDSCH (GC-PDSCH) and scheduled by the scheduling information). Accordingly, the UE 120 is aware of which numerology to use for decoding a GC communication based at least in part on which CFR is used to receive the GC communication.

In some aspects, the base station 110 may configure a first set of slots for the first numerology (e.g., for NGC communications and GC communications using the first numerology) and a second set of slots for the second numerology (e.g., for GC communications using the second numerology). For example, the base station 110 may use a radio resource control (RRC) message and/or a medium access control (MAC) control element (MAC-CE) to indicate the first set of slots and the second set of slots to the UE 120. Accordingly, the UE 120 is able to receive NGC communications and GC communications using the first numerology and GC communications using the second numerology without conflict.

As an alternative, the base station 110 may overlap NGC communications or GC communications using the first numerology with GC communications using the second numerology in a slot. Accordingly, the UE 120 may use priorities associated with the overlapped communications to determine which communication to receive. For example, the UE 120 may receive whichever communication is associated with a higher priority. When scheduling information (e.g., on GC-PDCCHs) overlaps, the UE 120 may use priorities indicated in an RRC message to determine which scheduling information to receive. When data (e.g., on GC-PDSCHs) overlaps, the UE 120 may use priorities indicated in scheduling information (e.g., on GC-PDCCHs) to determine which data to receive.

By using techniques as described in connection with FIG. 3, the base station 110 allocates the first CFR 303a for the first numerology and the second CFR 303b for the second numerology in the BWP 301. As a result, the base station 110 conserves spectrum. Therefore, interference between cells is less likely because less spectrum is reserved, which conserves power and processing resources at the base station 110 and at the UE 120 by reducing chances of retransmissions and dropped packets.

As indicated above, FIG. 3 is provided as an example. Other examples may differ from what is described with respect to FIG. 3.

Figure 4:
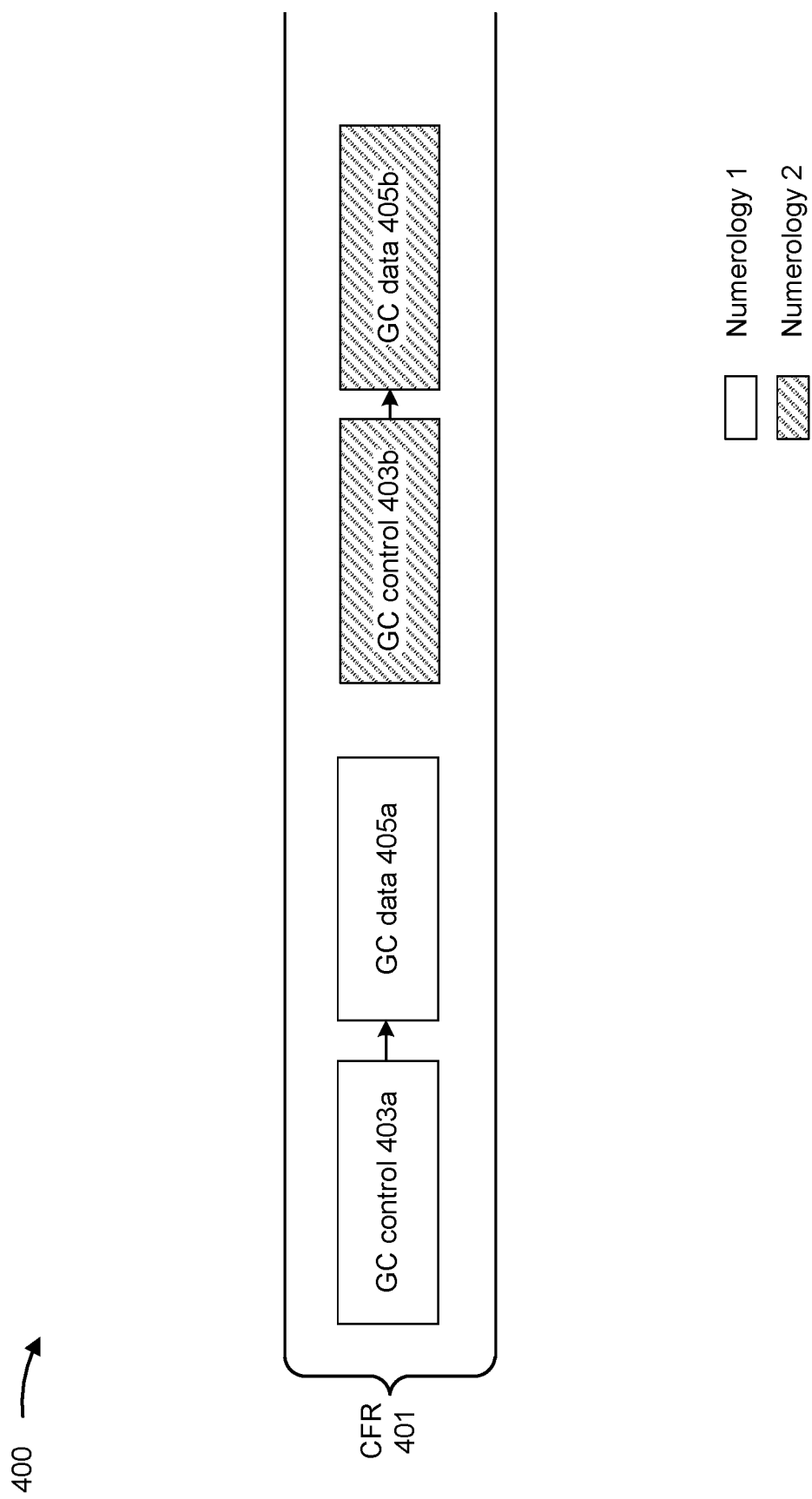
FIGS. 4 and 5 are diagrams illustrating examples associated with using a single CFR for different numerologies, in accordance with the present disclosure.

FIG. 4 is a diagram illustrating an example 400 associated with using a single CFR for different numerologies, in accordance with the present disclosure. As shown in FIG. 4, example 400 includes a CFR 401 (e.g., configured by a base station 110 for use by a UE 120) and associated with a first numerology and a second numerology. The second numerology may include a different SCS (e.g., 30 kHz instead of 15 kHz) and/or an ECP rather than an NCP in order to increase a range associated communications using the second numerology as compared with the first numerology.

As further shown in FIG. 4, the UE 120 may receive GC communications (e.g., multicast and/or broadcast communications associated with an MBS) in the CFR 401 using the first numerology. For example, the UE 120 may receive scheduling information (e.g., a GC control message 403a) in the CFR 401 that schedules a data transmission (e.g., a GC data message 405a) in the CFR 401. Similarly, the UE 120 may receive GC communications (e.g., multicast and/or broadcast communications associated with an MBS) in the CFR 401 using the second numerology. For example, the UE 120 may receive scheduling information (e.g., a GC control message 403b) in the CFR 401 that schedules a data transmission (e.g., a GC data message 405b) in the CFR 401. Accordingly, the UE 120 is aware of which numerology to use for decoding a GC communication based at least in part on the numerology of the scheduling information for the GC communication.

In order to configure the first and second numerologies within the CFR 401, the base station 110 may transmit, and the UE 120 may receive, an indication of a control resource set (CORESET) and a search space configuration associated with both the first numerology and the second numerology. For example, the base station 110 may transmit a PDCCH-Config-MBS data structure (e.g., as defined in 3GPP specifications and/or another standard) that indicates a CORESET and a search space for scheduling information and a PDCCH-Config-MBS data structure (e.g., as defined in 3GPP specifications and/or another standard) that indicates a CORESET and a search space for data transmissions. The base station 110 may additionally transmit, and the UE 120 may receive, an indicator of the second numerology. For example, the base station 110 may transmit a PDCCH-Config-MBS-Numerology that indicates the second numerology to use for scheduling information in the CORESET and the search space indicated in the PDCCH-Config-MBS data structure and for data transmissions in the CORESET and the search space indicated in the PDSCH-Config-MBS data structure.

As an alternative, the base station 110 may transmit, and the UE 120 may receive, an indication of a first CORESET and a first search space configuration associated with the first numerology and an indication of a second CORESET and a second search space configuration associated with the second numerology. For example, the base station 110 may transmit a PDCCH-Config-MBS data structure (e.g., as defined in 3GPP specifications and/or another standard) that indicates the first CORESET and the first search space for scheduling information using the first numerology and indicates the second CORESET and the second search space for scheduling information using the second numerology. Similarly, the base station 110 may transmit a PDSCH-Config-MBS data structure (e.g., as defined in 3GPP specifications and/or another standard) that indicates the first CORESET and the first search space for data transmissions using the first numerology and indicates the second CORESET and the second search space for data transmissions using the second numerology.

In some aspects, the base station 110 may configure a first set of slots for the first numerology (e.g., for GC communications using the first numerology) and a second set of slots for the second numerology (e.g., for GC communications using the second numerology). For example, the base station 110 may use an RRC message and/or a MAC-CE to indicate the first set of slots and the second set of slots to the UE 120. Accordingly, the UE 120 is able to receive GC communications using the first numerology and GC communications using the second numerology without conflict.

As an alternative, the base station 110 may overlap GC communications using the first numerology with GC communications using the second numerology in a slot. Accordingly, the UE 120 may use priorities associated with the overlapped communications to determine which communication to receive. For example, the UE 120 may receive whichever communication is associated with a higher priority. When scheduling information (e.g., on GC-PDCCHs) overlaps, the UE 120 may use priorities indicated in an RRC message to determine which scheduling information to receive. When data (e.g., on GC-PDSCHs) overlaps, the UE 120 may use priorities indicated in scheduling information (e.g., on GC-PDCCHs) to determine which data to receive.

By using techniques as described in connection with FIG. 4, the base station 110 uses multiple numerologies within a single CFR. As a result, the base station 110 conserves spectrum. Therefore, interference between cells is less likely because less spectrum is reserved, which conserves power and processing resources at the base station 110 and the UE 120 by reducing chances of retransmissions and dropped packets.

As indicated above, FIG. 4 is provided as an example. Other examples may differ from what is described with respect to FIG. 4.

Figure 5:
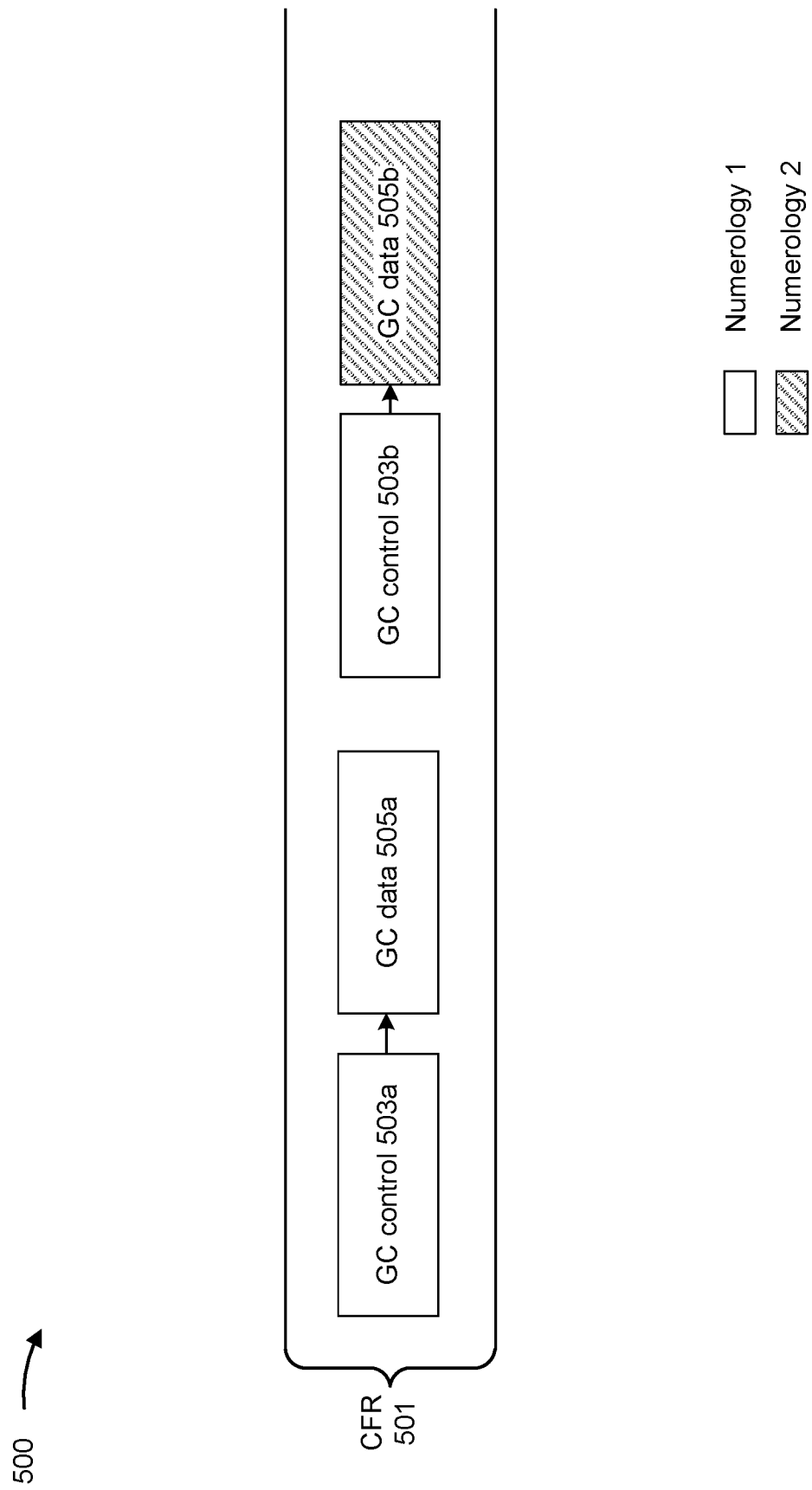

FIG. 5 is a diagram illustrating an example 500 associated with using a single CFR for different numerologies, in accordance with the present disclosure. As shown in FIG. 5, example 500 includes a CFR 501 (e.g., configured by a base station 110 for use by a UE 120) and associated with a first numerology and a second numerology. The second numerology may include a different SCS (e.g., 30 kHz instead of 15 kHz) and/or an ECP rather than an NCP in order to increase a range associated communications using the second numerology as compared with the first numerology.

As further shown in FIG. 5, the UE 120 may receive GC communications (e.g., multicast and/or broadcast communications associated with an MBS) in the CFR 501 using the first numerology. For example, the UE 120 may receive scheduling information (e.g., a GC control message 503a) in the CFR 501 using the first numerology that schedules a data transmission (e.g., a GC data message 505a) in the CFR 501 using the first numerology. Similarly, the UE 120 may receive GC communications (e.g., multicast and/or broadcast communications associated with an MBS) in the CFR 501 using the second numerology. For example, the UE 120 may receive scheduling information (e.g., a GC control message 503b) in the CFR 501 using the first numerology that schedules a data transmission (e.g., a GC data message 505b) in the CFR 501 using the second numerology.

Accordingly, the base station 110 indicates which numerology to use for decoding a GC data communication in corresponding scheduling information for the GC data communication, which is always transmitted using the first numerology. For example, the base station 110 may transmit downlink control information (DCI) that includes a field indicating whether a GC data communication, scheduled by the DCI, will be transmitted using the first numerology or the second numerology. Additionally, or alternatively, the base station 110 may associate a first radio network temporary identifier (RNTI), such as a first group RNTI (G-RNTI), with the first numerology and a second RNTI, such as a second G-RNTI, with the second numerology such that the UE 120 determines whether a GC data communication will be transmitted using the first numerology or the second numerology based at least part on which RNTI is used to scramble the scheduling information for the GC data communication.

In some aspects, the GC data communication may be associated with a semi-persistent scheduling (SPS) configuration rather than a dynamic grant. Accordingly, the base station 110 may use a field in DCI and/or different group—configured scheduling RNTIs (G-CS-RNTIs) for scrambling to indication whether a GC data communication will be transmitted using the first numerology or the second numerology. Additionally, or alternatively, the base station 110 may indicate the second numerology in an SPS-Config-Multicast data structure (e.g., as defined in 3GPP specifications and/or another standard). Accordingly, activation DCI associated with the SPS configuration may indicate the second numerology by indicating the SPS-Config-Multicast data structure (e.g., using an SPS-Config-Index variable, as defined in 3GPP specifications and/or another standard).

In order to configure the first and second numerologies within the CFR 501, the base station 110 may transmit, and the UE 120 may receive, an indication of a CORESET and a search space configuration associated with both the first numerology and the second numerology. For example, the base station 110 may transmit a PDCCH-Config-MBS data structure (e.g., as defined in 3GPP specifications and/or another standard) that indicates a CORESET and a search space for scheduling information and a PDCCH-Config-MBS data structure (e.g., as defined in 3GPP specifications and/or another standard) that indicates a CORESET and a search space for data transmissions. The base station 110 may additionally transmit, and the UE 120 may receive, an indicator of the second numerology. For example, the base station 110 may transmit a PDSCH-Config-MBS-Numerology that indicates the second numerology to use for data transmissions in the CORESET and the search space indicated in the PDSCH-Config-MBS data structure.

As an alternative, the base station 110 may transmit, and the UE 120 may receive, an indication of a first CORESET and a first search space configuration associated with the first numerology and an indication of a second CORESET and a second search space configuration associated with the second numerology. For example, the base station 110 may transmit a PDCCH-Config-MBS data structure (e.g., as defined in 3GPP specifications and/or another standard) that indicates the CORESET and the search space for scheduling information using the first numerology. Additionally, the base station 110 may transmit a PDSCH-Config-MBS data structure (e.g., as defined in 3GPP specifications and/or another standard) that indicates the first CORESET and the first search space for data transmissions using the first numerology and indicates the second CORESET and the second search space for data transmissions using the second numerology.

By using techniques as described in connection with FIG. 5, the base station 110 uses multiple numerologies within a single CFR. As a result, the base station 110 conserves spectrum. Therefore, interference between cells is less likely because less spectrum is reserved, which conserves power and processing resources at the base station 110 and the UE 120 by reducing chances of retransmissions and dropped packets.

As indicated above, FIG. 5 is provided as an example. Other examples may differ from what is described with respect to FIG. 5.

Figure 6A:
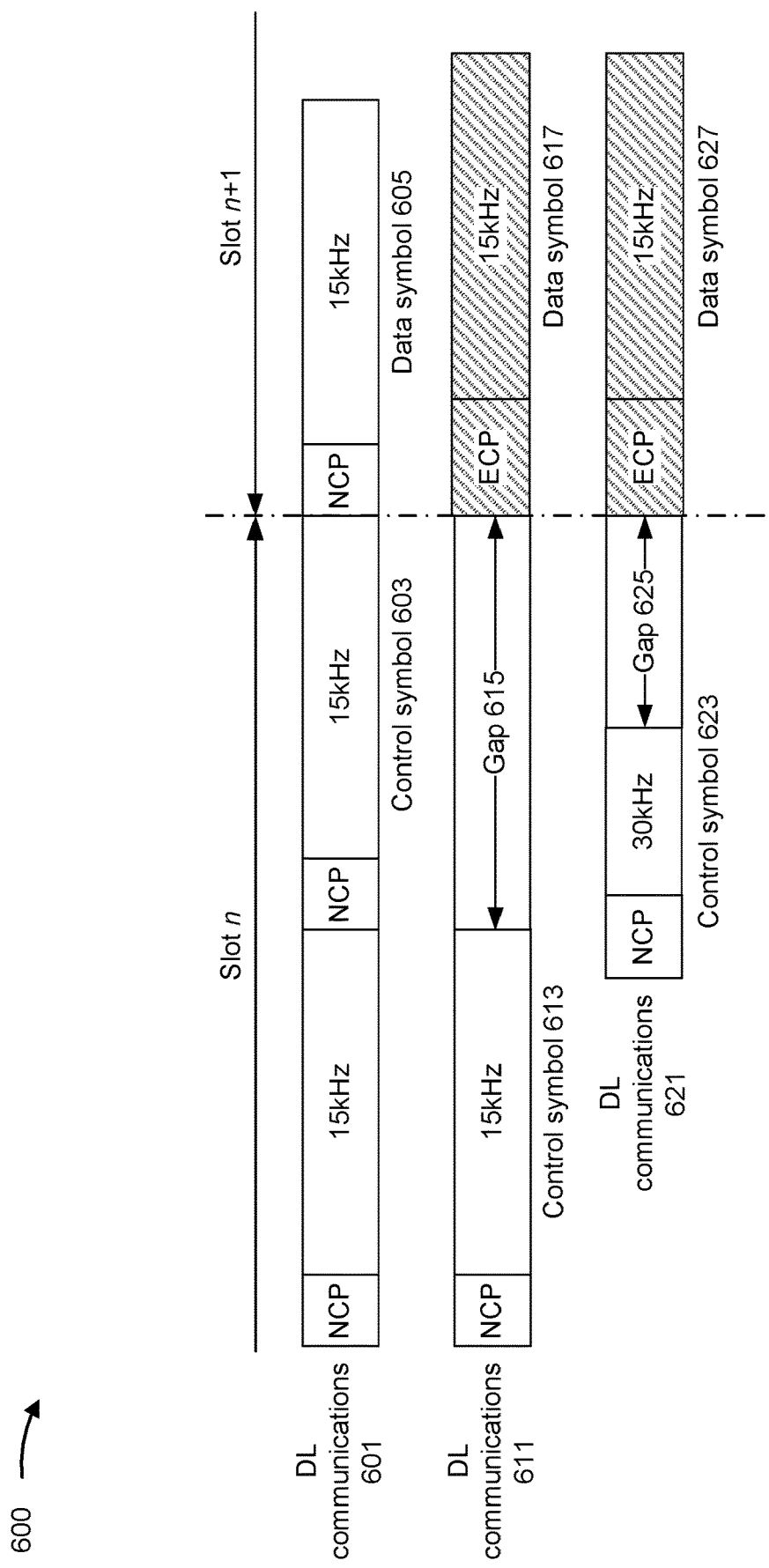
FIGS. 6A and 6B are diagrams illustrating examples associated with a time gap between scheduling information and data transmission of different numerologies, in accordance with the present disclosure.
Figure 6B:
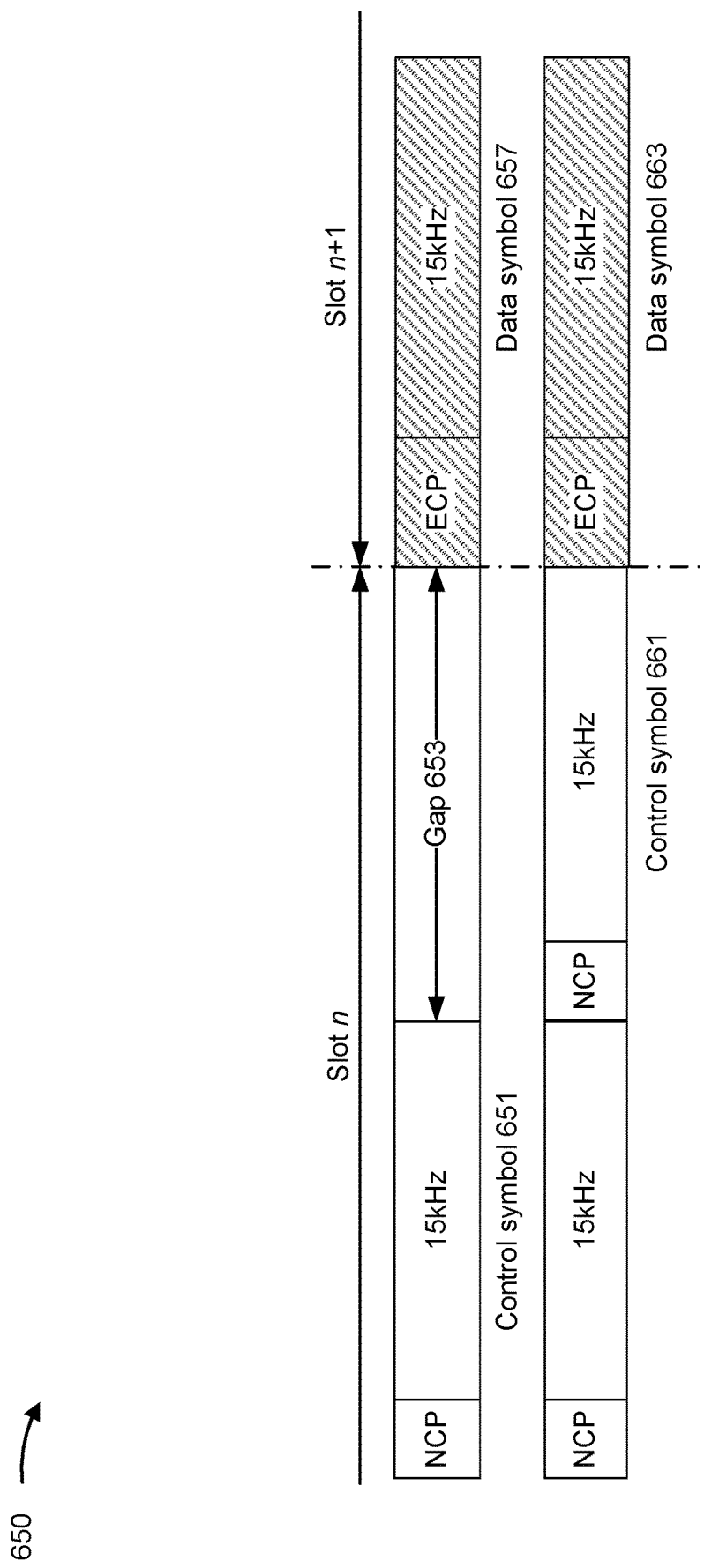

FIGS. 6A and 6B are diagrams illustrating examples 600 and 650, respectively, associated with a time gap between scheduling information and data transmission of different numerologies, in accordance with the present disclosure. Examples 600 and 650 both show symbols within a first slot (shown as "slot n") and a subsequent slot (shown as "slot n+1"). In example 600, for downlink communication set 601, the UE 120 may receive control information in symbol 603 before receiving data in symbol 605, scheduled by the control information, without a gap therebetween because symbols 603 and 605 are decoded using the same numerology.

For downlink communication set 611, the UE 120 may use a gap 615 between receiving control information in symbol 613 and receiving data in symbol 617, scheduled by the control information, because symbols 613 and 617 are decoded using different numerology. Although the symbols 613 and 617 use a same SCS and thus a same fast Fourier transform (FFT) size, the UE 120 processes an ECP differently than an NCP and therefore uses the gap 615 to modify processing applied to signals received in symbol 617 as compared with processing applied to signals received in symbol 613.

Similarly, for downlink communication set 621, the UE 120 may use a gap 625 between receiving control information in symbol 623 and receiving data in symbol 627, scheduled by the control information, because symbols 623 and 627 are decoded using different numerology. The symbols 623 and 627 use a different SCS and thus use a different FFT size, so the UE 120 uses the gap 625 to modify FFT processing applied to signals received in symbol 627 as compared with FFT processing applied to signals received in symbol 623.

Example 650 shows that the UE 120 uses a gap 653 that is at least a minimum size between receiving control information in symbol 651 and receiving data in symbol 657, scheduled by the control information, because symbols 651 and 657 are decoded using different numerology. However, the UE 120 may use a gap smaller than a minimum size (or even zero) when receiving data in symbol 663, scheduled by control information in symbol 661, when applying a default configuration. For example, the default configuration may be indicated using RRC signaling and/or a MAC-CE and may apply in one or more CORESETs and/or search spaces.

Similarly, the UE 120 may apply a default transmission configuration indicator (TCI) state to receive data when the gap is smaller than a minimum size (or even zero). For example, the base station 110 may indicate a default TCI state for NCP communications and a default TCI state for ECP communications. As an alternative, the default TCI state for NCP communications may be a TCI state associated with a lowest identifier (ID) of TCI states for NCP communications. Similarly, the default TCI state for ECP communications may be a TCI state associated with a lowest ID of TCI states for ECP communications.

By using techniques as described in connection with FIG. 6A and/or FIG. 6B, the base station 110 can use multiple numerologies within a single CFR. As a result, the base station 110 conserves spectrum. Therefore, interference between cells is less likely because less spectrum is reserved, which conserves power and processing resources at the base station 110 and the UE 120 by reducing chances of retransmissions and dropped packets.

As indicated above, FIGS. 6A and 6B are provided as examples. Other examples may differ from what is described with respect to FIGS. 6A and 6B.

Figure 7:
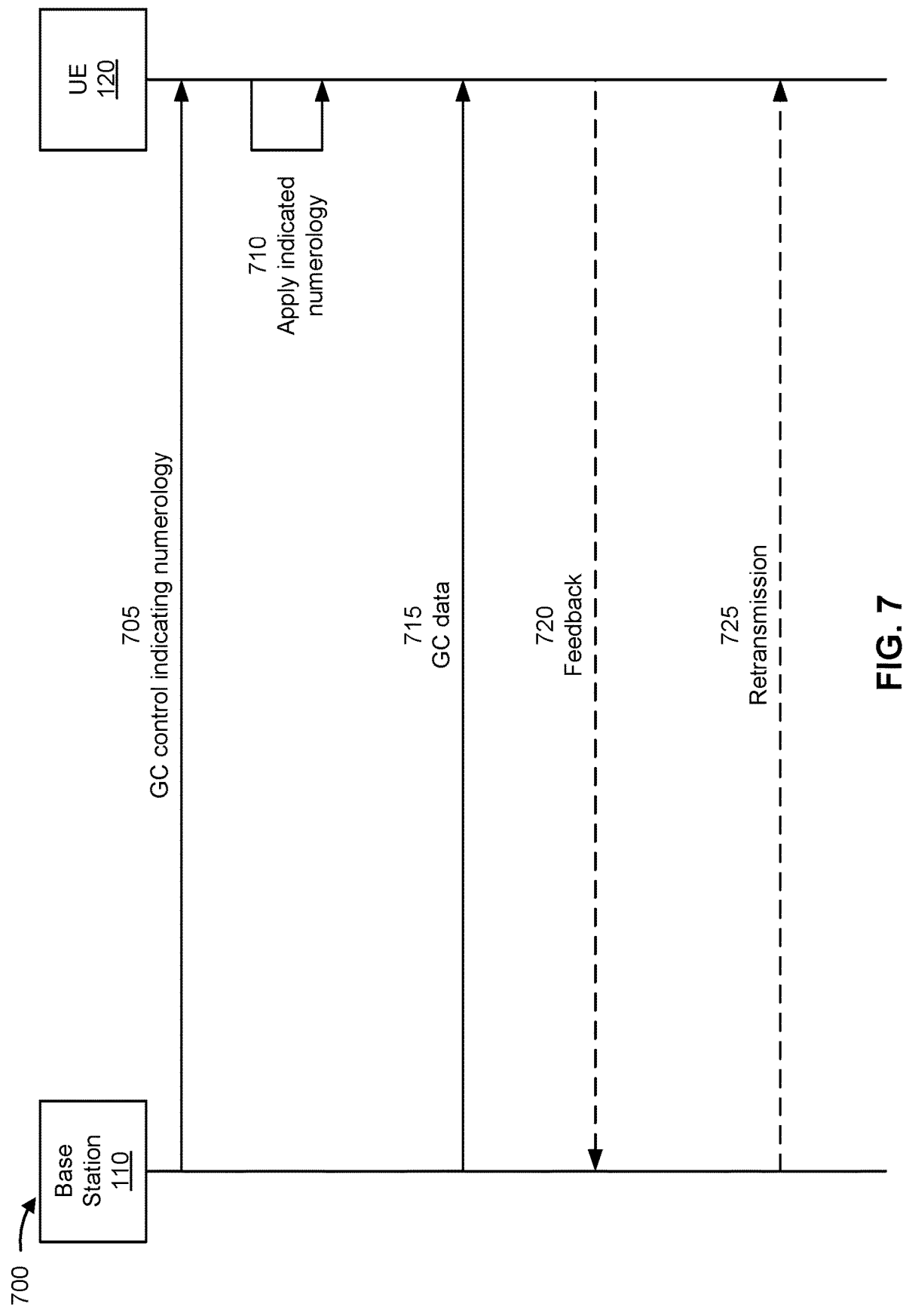
FIG. 7 is a diagram illustrating an example associated with indications of, and retransmissions for, different numerologies, in accordance with the present disclosure.

FIG. 7 is a diagram illustrating an example 700 associated with indications of, and retransmissions for, different numerologies, in accordance with the present disclosure. As shown in FIG. 7, a base station 110 and a UE 120 may communicate with one another. In example 700, the base station 110 uses a CFR associated with a first numerology and a second numerology (e.g., as described in connection with FIG. 4 or FIG. 5). The second numerology may include a different SCS (e.g., 30 kHz instead of 15 kHz) and/or an ECP rather than an NCP in order to increase a range associated communications using the second numerology as compared with the first numerology.

As shown by reference number 705, the base station 110 may transmit, and the UE 120 may receive, a GC control communication, with scheduling information for a GC data communication, using the first numerology. The GC control communication may indicate whether to use the first numerology or the second numerology to decode the scheduled GC data communication. For example, the GC control communication may include DCI that includes a field indicating whether to use the first numerology or the second numerology. Additionally, or alternatively, the GC control information may be scrambled using a RNTI, such as a G-RNTI, that is associated with the first numerology or is associated with the second numerology.

Accordingly, as shown by reference number 710, the UE 120 may apply the first numerology or the second numerology. As shown by reference number 715, the base station 110 may transmit, and the UE 120 may receive, the GC data communication using the indicated numerology.

As shown by reference number 720, when the UE 120 fails to receive or successfully decode the GC data communication, the UE 120 may transmit feedback to the base station 110, such as a negative acknowledgement (NACK) signal or other hybrid automatic repeat request (HARQ) feedback. In response, and as shown by reference number 725, the base station 110 may transmit, and the UE 120 may receive, a retransmission of the GC data communication.

In some aspects, the base station 110 may use a same numerology, HARQ process identifier (HPID), and a same new data indicator (NDI) as used for an initial transmission of the GC data communication. Accordingly, the base station 110 schedules the retransmission using a same numerology and G-RNTI as used for scheduling the initial transmission of the GC data communication.

As an alternative, the base station 110 may use NCP for retransmission, along with a same HPID and a same NDI as used for an initial transmission of the GC data communication. Accordingly, the base station 110 schedules the retransmission using NCP, along with a same G-RNTI as used for scheduling the initial transmission of the GC data communication. As an alternative, the base station 110 may schedule the retransmission using ECP, along with a different G-RNTI that is associated with an NCP retransmission of an initial transmission that used ECP.

As an alternative, the base station 110 may unicast the retransmission to the UE 120, such that the base station 110 uses NCP for retransmission, along with a same HPID and a same NDI as used for an initial transmission of the GC data communication. Accordingly, the base station 110 schedules the retransmission using NCP, along with a cell RNTI (C-RNTI) that is specific to the UE 120.

By using techniques as described in connection with FIG. 7, the base station 110 can retransmit even when using multiple numerologies within a single CFR. As a result, the base station 110 and the UE 120 experience increased throughput and fewer dropped packets.

As indicated above, FIG. 7 is provided as an example. Other examples may differ from what is described with respect to FIG. 7.

Figure 8:
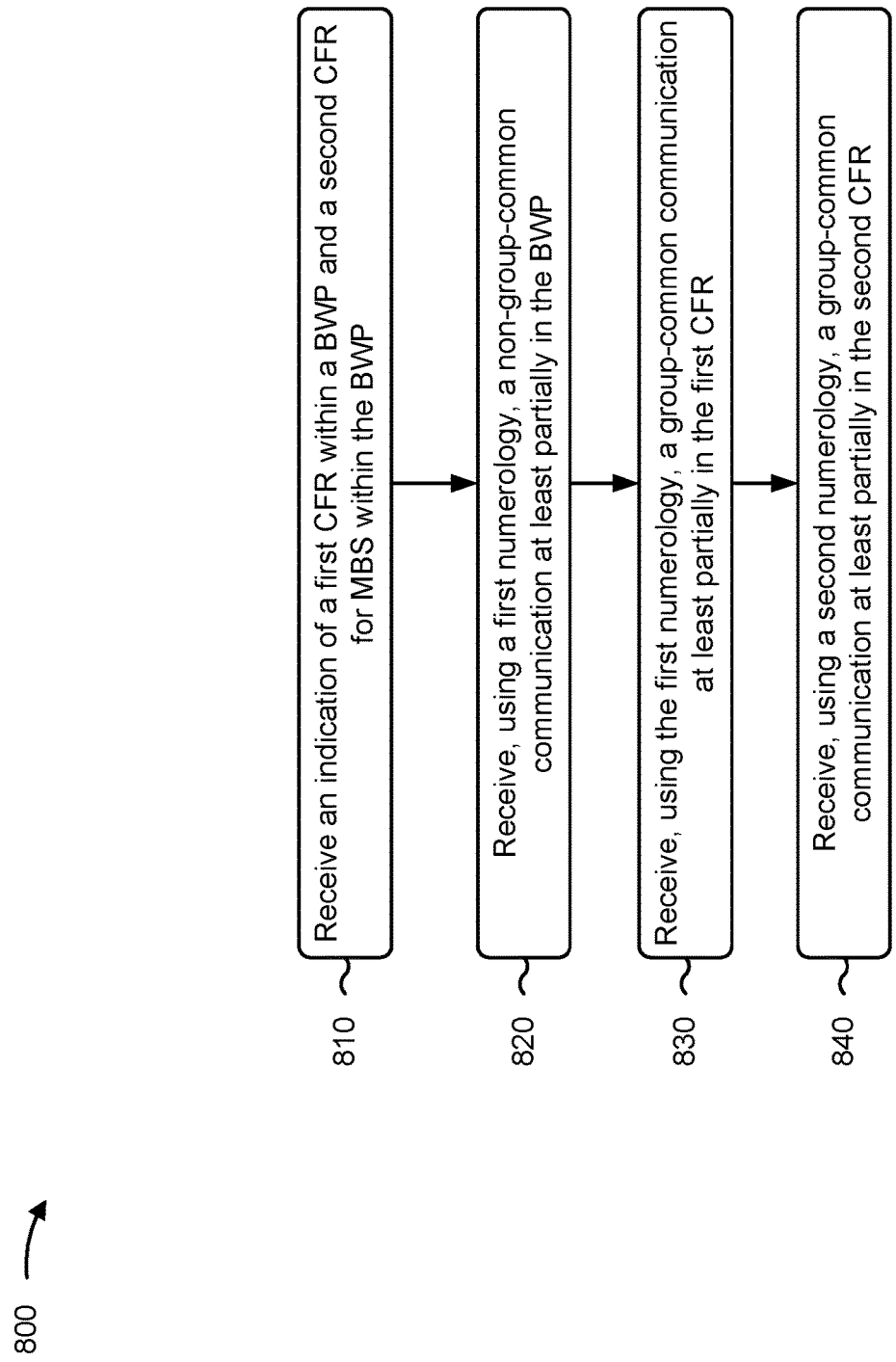
FIGS. 8, 9, 10, and 11 are diagrams illustrating example processes associated with configuring CFRs for different numerologies, in accordance with the present disclosure.

FIG. 8 is a diagram illustrating an example process 800 performed, for example, by a UE, in accordance with the present disclosure. Example process 800 is an example where the UE (e.g., UE 120 and/or apparatus 1200 of FIG. 12) performs operations associated with using CFRs for different numerologies.

As shown in FIG. 8, in some aspects, process 800 may include receiving, from a base station (e.g., base station 110 and/or apparatus 1300 of FIG. 13), an indication of a first CFR within a BWP and a second CFR for MBS within the BWP (block 810). For example, the UE (e.g., using communication manager 140 and/or reception component 1202, depicted in FIG. 12) may receive, from a base station, an indication of a first CFR within a BWP and a second CFR for MBS within the BWP, as described herein.

As further shown in FIG. 8, in some aspects, process 800 may include receiving, using a first numerology, a non-group-common communication at least partially in the BWP (block 820). For example, the UE (e.g., using communication manager 140 and/or reception component 1202) may receive, using a first numerology, a non-group-common communication at least partially in the BWP, as described herein.

As further shown in FIG. 8, in some aspects, process 800 may include receiving, using the first numerology, a group-common communication at least partially in the first CFR (block 830). For example, the UE (e.g., using communication manager 140 and/or reception component 1202) may receive, using the first numerology, a group-common communication at least partially in the first CFR, as described herein.

As further shown in FIG. 8, in some aspects, process 800 may include receiving, using a second numerology, a group-common communication at least partially in the second CFR (block 840). For example, the UE (e.g., using communication manager 140 and/or reception component 1202) may receive, using a second numerology, a group-common communication at least partially in the second CFR, as described herein.

Process 800 may include additional aspects, such as any single aspect or any combination of aspects described below and/or in connection with one or more other processes described elsewhere herein.

In a first aspect, the first numerology is associated with an NCP, and the second numerology is associated with an ECP.

In a second aspect, alone or in combination with the first aspect, the first numerology is associated with an SCS that is different than an SCS associated with the second numerology.

In a third aspect, alone or in combination with one or more of the first and second aspects, process 800 further includes receiving (e.g., using communication manager 140 and/or reception component 1202), from the base station, an indication of a first set of slots associated with the first numerology and a second set of slots associated with the second numerology, where the non-group-common communication is received in at least one slot of the first set of slots, the group-common communication in the first CFR is received in at least one slot of the first set of slots, and the group-common communication in the second CFR is received in at least one slot of the second set of slots.

In a fourth aspect, alone or in combination with one or more of the first through third aspects, process 800 further includes receiving (e.g., using communication manager 140 and/or reception component 1202), from the base station, an indication of a priority associated with a group-common communication at least partially in the first CFR and a priority associated with an additional group-common communication at least partially in the second CFR, and receiving (e.g., using communication manager 140 and/or reception component 1202) the group-common communication at least partially in the first CFR or the additional group-common communication at least partially in the second CFR based at least in part on the priorities, where the group-common communication at least partially in the first CFR and the additional group-common communication at least partially in the second CFR overlap within a same slot.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
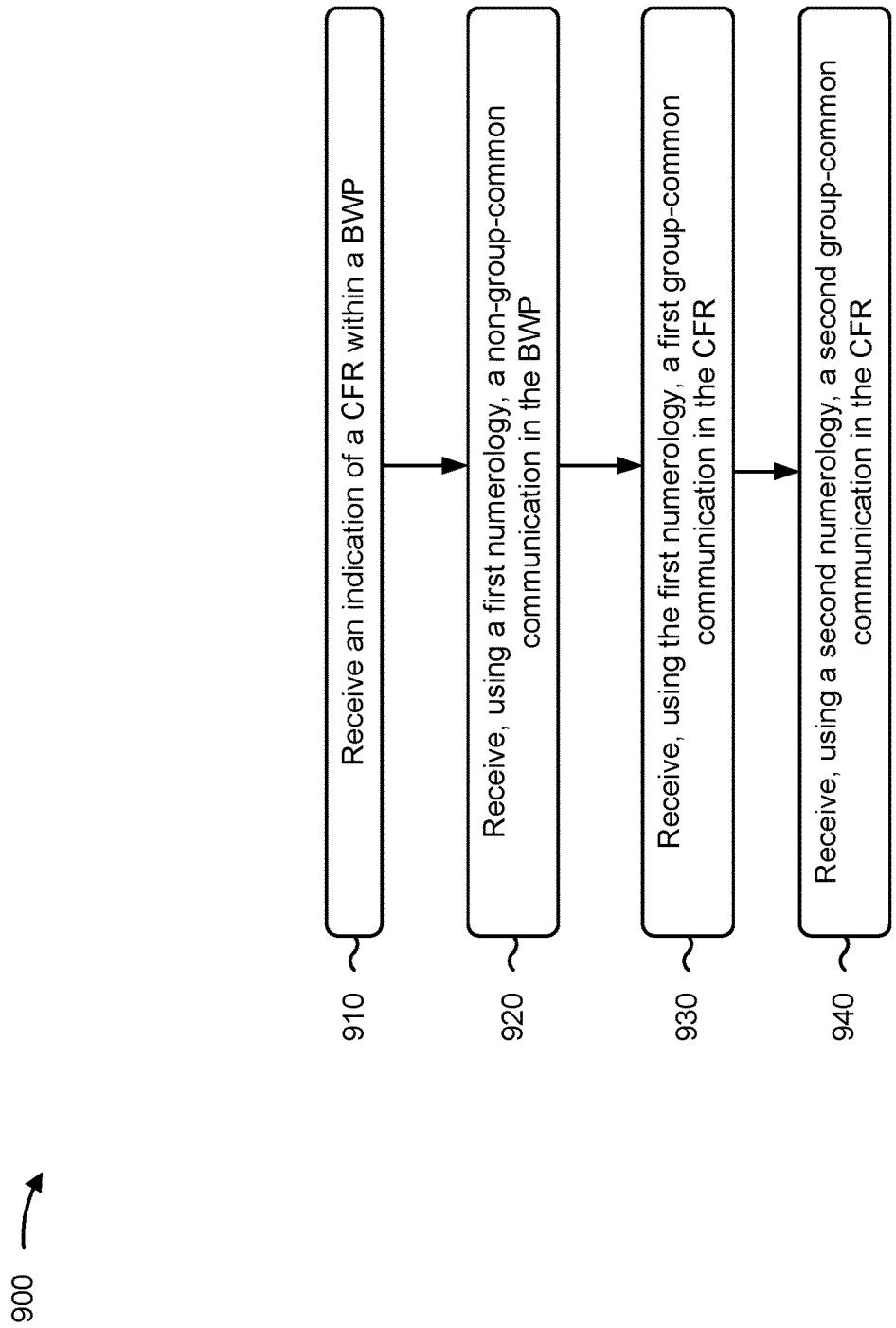

FIG. 9 is a diagram illustrating an example process 900 performed, for example, by a UE, in accordance with the present disclosure. Example process 900 is an example where the UE (e.g., UE 120 and/or apparatus 1200 of FIG. 12) performs operations associated with using a CFR for different numerologies.

As shown in FIG. 9, in some aspects, process 900 may include receiving, from a base station (e.g., base station 110 and/or apparatus 1300 of FIG. 13), an indication of a CFR within a BWP (block 910). For example, the UE (e.g., using communication manager 140 and/or reception component 1202, depicted in FIG. 12) may receive, from a base station, an indication of a CFR within a BWP, as described herein.

As further shown in FIG. 9, in some aspects, process 900 may include receiving, using a first numerology, a non-group-common communication in the BWP (block 920). For example, the UE (e.g., using communication manager 140 and/or reception component 1202) may receive, using a first numerology, a non-group-common communication in the BWP, as described herein.

As further shown in FIG. 9, in some aspects, process 900 may include receiving, using the first numerology, a first group-common communication in the CFR (block 930). For example, the UE (e.g., using communication manager 140 and/or reception component 1202) may receive, using the first numerology, a first group-common communication in the CFR, as described herein.

As further shown in FIG. 9, in some aspects, process 900 may include receiving, using a second numerology, a second group-common communication in the CFR (block 940). For example, the UE (e.g., using communication manager 140 and/or reception component 1202) may receive, using a second numerology, a second group-common communication in the CFR, as described herein.

Process 900 may include additional aspects, such as any single aspect or any combination of aspects described below and/or in connection with one or more other processes described elsewhere herein.

In a first aspect, process 900 further includes receiving (e.g., using communication manager 140 and/or reception component 1202), from the base station, an indication of a first set of slots associated with the first numerology and a second set of slots associated with the second numerology, where the non-group-common communication is received in at least one slot of the first set of slots, the first group-common communication is received in at least one slot of the first set of slots, and the second group-common communication is received in at least one slot of the second set of slots.

In a second aspect, alone or in combination with the first aspect, process 900 further includes receiving (e.g., using communication manager 140 and/or reception component 1202), from the base station, an indication of a priority associated with a third group-common communication and a priority associated with a fourth group-common communication, and receiving (e.g., using communication manager 140 and/or reception component 1202) the third group-common communication or the fourth group-common communication based at least in part on the priorities, where the third group-common communication and the fourth group-common communication overlap within a same slot.

In a third aspect, alone or in combination with one or more of the first and second aspects, the indication includes a CORESET and search space configuration associated with both the first numerology and the second numerology and an indicator of the second numerology.

In a fourth aspect, alone or in combination with one or more of the first through third aspects, the indication includes a first CORESET and search space configuration associated with the first numerology, and a second CORESET and search space configuration associated with the second numerology.

In a fifth aspect, alone or in combination with one or more of the first through fourth aspects, the first group-common communication includes scheduling information received using the first numerology, and the second group-common communication includes scheduling information received using the second numerology.

In a sixth aspect, alone or in combination with one or more of the first through fifth aspects, the first group-common communication is scheduled according to first scheduling information received using the first numerology, and the second group-common communication is scheduled according to second scheduling information received using the first numerology.

In a seventh aspect, alone or in combination with one or more of the first through sixth aspects, the second scheduling information includes an indication of the second numerology.

In an eighth aspect, alone or in combination with one or more of the first through seventh aspects, the second scheduling information is scrambled using an RNTI associated with the second numerology.

In a ninth aspect, alone or in combination with one or more of the first through eighth aspects, the second scheduling information includes activation DCI for SPS and includes an indication of an SPS configuration associated with the second numerology.

In a tenth aspect, alone or in combination with one or more of the first through ninth aspects, the second group-common communication is received after at least a minimum time gap has elapsed since the second scheduling information was received.

In an eleventh aspect, alone or in combination with one or more of the first through tenth aspects, the second group-common communication is received after less than a minimum time gap has elapsed since the second scheduling information was received, and the second numerology is associated with a default configuration.

In a twelfth aspect, alone or in combination with one or more of the first through eleventh aspects, the second group-common communication is received using a default TCI state.

In a thirteenth aspect, alone or in combination with one or more of the first through twelfth aspects, process 900 further includes receiving (e.g., using communication manager 140 and/or reception component 1202), from the base station, a retransmission of the second group-common communication, where the retransmission is received as a multicast transmission using the second numerology.

In a fourteenth aspect, alone or in combination with one or more of the first through thirteenth aspects, process 900 further includes receiving (e.g., using communication manager 140 and/or reception component 1202), from the base station, a retransmission of the second group-common communication, where the retransmission is received as a multicast transmission using the first numerology.

In a fifteenth aspect, alone or in combination with one or more of the first through fourteenth aspects, process 900 further includes receiving (e.g., using communication manager 140 and/or reception component 1202), from the base station, a retransmission of the second group-common communication, where the retransmission is received as a unicast transmission using the first numerology.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
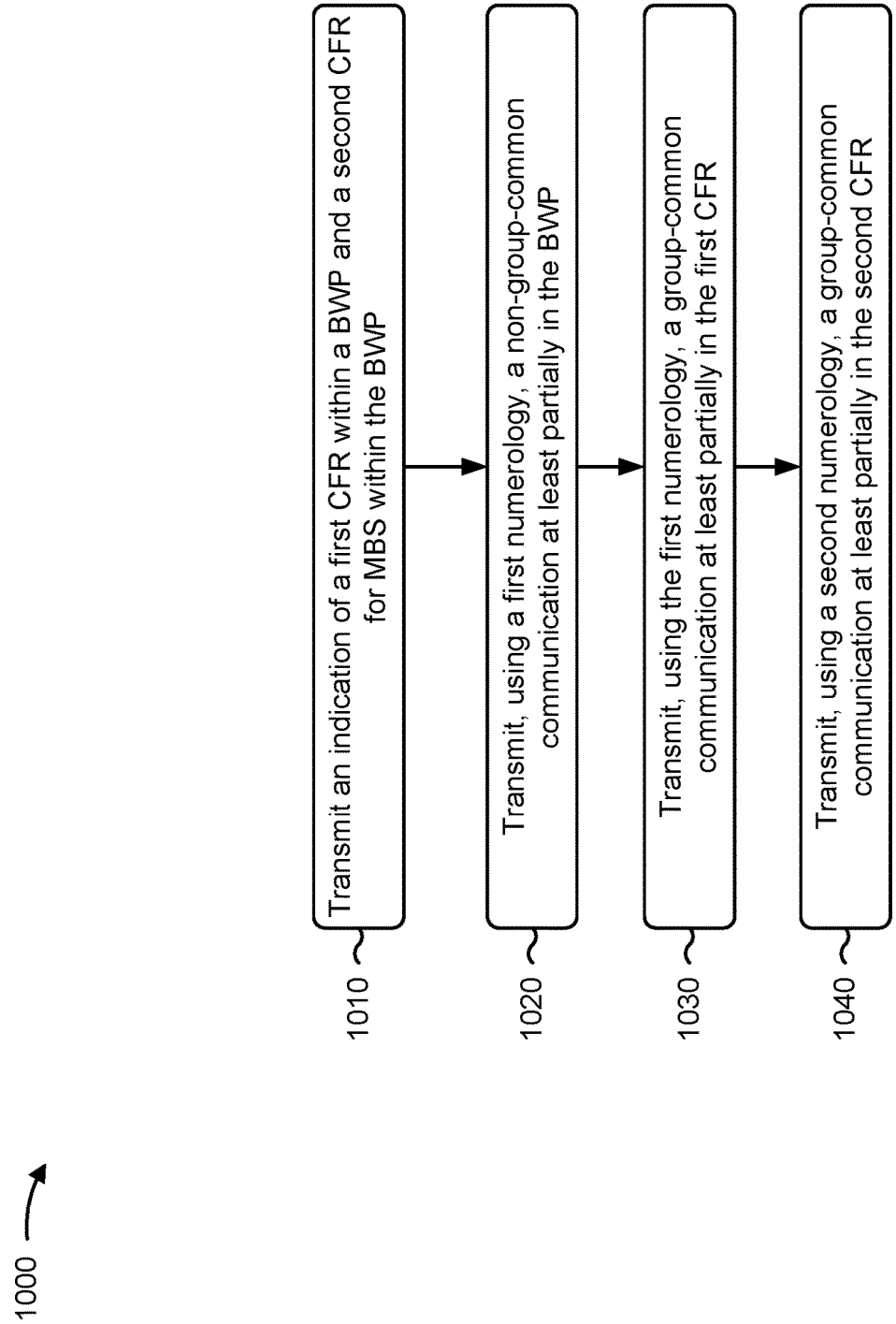

FIG. 10 is a diagram illustrating an example process 1000 performed, for example, by a base station, in accordance with the present disclosure. Example process 1000 is an example where the base station (e.g., base station 110 and/or apparatus 1300 of FIG. 13) performs operations associated with configuring CFRs for different numerologies.

As shown in FIG. 10, in some aspects, process 1000 may include transmitting, to a UE (e.g., UE 120 and/or apparatus 1200 of FIG. 12), an indication of a first CFR within a BWP and a second CFR for MBS within the BWP (block 1010). For example, the base station (e.g., using communication manager 150 and/or transmission component 1304, depicted in FIG. 13) may transmit, to a UE, an indication of a first CFR within a BWP and a second CFR for MBS within the BWP, as described herein.

As further shown in FIG. 10, in some aspects, process 1000 may include transmitting, using a first numerology, a non-group-common communication at least partially in the BWP (block 1020). For example, the base station (e.g., using communication manager 150 and/or transmission component 1304) may transmit, using a first numerology, a non-group-common communication at least partially in the BWP, as described herein.

As further shown in FIG. 10, in some aspects, process 1000 may include transmitting, using the first numerology, a group-common communication at least partially in the first CFR (block 1030). For example, the base station (e.g., using communication manager 150 and/or transmission component 1304) may transmit, using the first numerology, a group-common communication at least partially in the first CFR, as described herein.

As further shown in FIG. 10, in some aspects, process 1000 may include transmitting, using a second numerology, a group-common communication at least partially in the second CFR (block 1040). For example, the base station (e.g., using communication manager 150 and/or transmission component 1304) may transmit, using a second numerology, a group-common communication at least partially in the second CFR, as described herein.

Process 1000 may include additional aspects, such as any single aspect or any combination of aspects described below and/or in connection with one or more other processes described elsewhere herein.

In a first aspect, the first numerology is associated with an NCP, and the second numerology is associated with an ECP.

In a second aspect, alone or in combination with the first aspect, the first numerology is associated with an SCS that is different than an SCS associated with the second numerology.

In a third aspect, alone or in combination with one or more of the first and second aspects, process 1000 includes transmitting (e.g., using communication manager 150 and/or transmission component 1304), to the UE, an indication of a first set of slots associated with the first numerology and a second set of slots associated with the second numerology, where the non-group-common communication is transmitted in at least one slot of the first set of slots, the group-common communication in the first CFR is transmitted in at least one slot of the first set of slots, and the group-common communication in the second CFR is transmitted in at least one slot of the second set of slots.

In a fourth aspect, alone or in combination with one or more of the first through fifth aspects, process 1000 further includes transmitting (e.g., using communication manager 150 and/or transmission component 1304), to the UE, an indication of a priority associated with an additional group-common communication at least partially in the first CFR and a priority associated with an additional group-common communication at least partially in the second CFR, where the additional group-common communication at least partially in the first CFR and the additional group-common communication at least partially in the second CFR overlap within a same slot.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
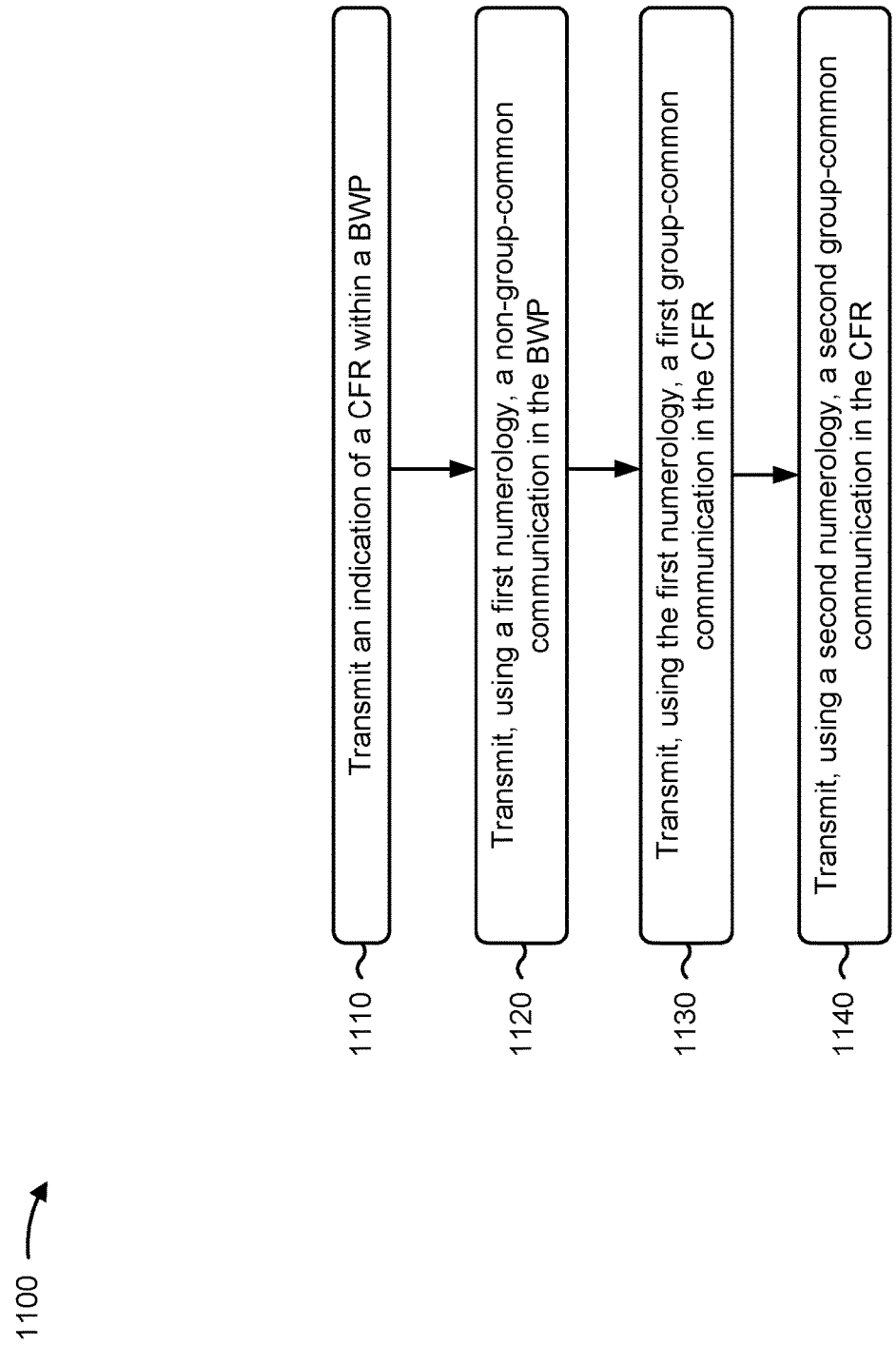

FIG. 11 is a diagram illustrating an example process 1100 performed, for example, by a base station, in accordance with the present disclosure. Example process 1100 is an example where the base station (e.g., base station 110 and/or apparatus 1300 of FIG. 13) performs operations associated with configuring a CFR for different numerologies.

As shown in FIG. 11, in some aspects, process 1100 may include transmitting, to a UE (e.g., UE 120 and/or apparatus 1200 of FIG. 12), an indication of a CFR within a BWP (block 1110). For example, the base station (e.g., using communication manager 150 and/or transmission component 1304, depicted in FIG. 13) may transmit, to a UE, an indication of a CFR within a BWP, as described herein.

As further shown in FIG. 11, in some aspects, process 1100 may include transmitting, using a first numerology, a non-group-common communication in the BWP (block 1120). For example, the base station (e.g., using communication manager 150 and/or transmission component 1304) may transmit, using a first numerology, a non-group-common communication in the BWP, as described herein.

As further shown in FIG. 11, in some aspects, process 1100 may include transmitting, using the first numerology, a first group-common communication in the CFR (block 1130). For example, the base station (e.g., using communication manager 150 and/or transmission component 1304) may transmit, using the first numerology, a first group-common communication in the CFR, as described herein.

As further shown in FIG. 11, in some aspects, process 1100 may include transmitting, using a second numerology, a second group-common communication in the CFR (block 1140). For example, the base station (e.g., using communication manager 150 and/or transmission component 1304) may transmit, using a second numerology, a second group-common communication in the CFR, as described herein.

Process 1100 may include additional aspects, such as any single aspect or any combination of aspects described below and/or in connection with one or more other processes described elsewhere herein.

In a first aspect, process 1100 further includes transmitting (e.g., using communication manager 150 and/or transmission component 1304), to the UE, an indication of a first set of slots associated with the first numerology and a second set of slots associated with the second numerology, where the non-group-common communication is transmitted in at least one slot of the first set of slots, the first group-common communication is transmitted in at least one slot of the first set of slots, and the second group-common communication is transmitted in at least one slot of the second set of slots.

In a second aspect, alone or in combination with the first aspect, process 1100 further includes transmitting (e.g., using communication manager 150 and/or transmission component 1304), to the UE, an indication of a priority associated with a third group-common communication and a priority associated with a fourth group-common communication, where the third group-common communication and the fourth group-common communication overlap within a same slot.

In a third aspect, alone or in combination with one or more of the first and second aspects, the indication includes a CORESET and search space configuration associated with both the first numerology and the second numerology and an indicator of the second numerology.

In a fourth aspect, alone or in combination with one or more of the first through third aspects, the indication includes a first CORESET and search space configuration associated with the first numerology, and a second CORESET and search space configuration associated with the second numerology.

In a fifth aspect, alone or in combination with one or more of the first through fourth aspects, the first group-common communication includes scheduling information received using the first numerology, and the second group-common communication includes scheduling information received using the second numerology.

In a sixth aspect, alone or in combination with one or more of the first through fifth aspects, the first group-common communication is scheduled according to first scheduling information received using the first numerology, and the second group-common communication is scheduled according to second scheduling information received using the first numerology.

In a seventh aspect, alone or in combination with one or more of the first through sixth aspects, the second scheduling information includes an indication of the second numerology.

In an eighth aspect, alone or in combination with one or more of the first through seventh aspects, the second scheduling information is scrambled using an RNTI associated with the second numerology.

In a ninth aspect, alone or in combination with one or more of the first through eighth aspects, the second scheduling information includes activation DCI for SPS and includes an indication of an SPS configuration associated with the second numerology.

In a tenth aspect, alone or in combination with one or more of the first through ninth aspects, the second group-common communication is transmitted after at least a minimum time gap has elapsed since the second scheduling information was received.

In an eleventh aspect, alone or in combination with one or more of the first through tenth aspects, the second group-common communication is transmitted after less than a minimum time gap has elapsed since the second scheduling information was received, and the second numerology is associated with a default configuration.

In a twelfth aspect, alone or in combination with one or more of the first through eleventh aspects, the second group-common communication is transmitted using a default TCI state.

In a thirteenth aspect, alone or in combination with one or more of the first through twelfth aspects, process 1100 further includes transmitting (e.g., using communication manager 150 and/or transmission component 1304), to the UE, a retransmission of the second group-common communication, where the retransmission is transmitted as a multicast transmission using the second numerology.

In a fourteenth aspect, alone or in combination with one or more of the first through thirteenth aspects, process 1100 further includes transmitting (e.g., using communication manager 150 and/or transmission component 1304), to the UE, a retransmission of the second group-common communication, where the retransmission is transmitted as a multicast transmission using the first numerology.

In a fifteenth aspect, alone or in combination with one or more of the first through fourteenth aspects, process 1100 further includes transmitting (e.g., using communication manager 150 and/or transmission component 1304), to the UE, a retransmission of the second group-common communication, where the retransmission is transmitted as a unicast transmission using the first numerology.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
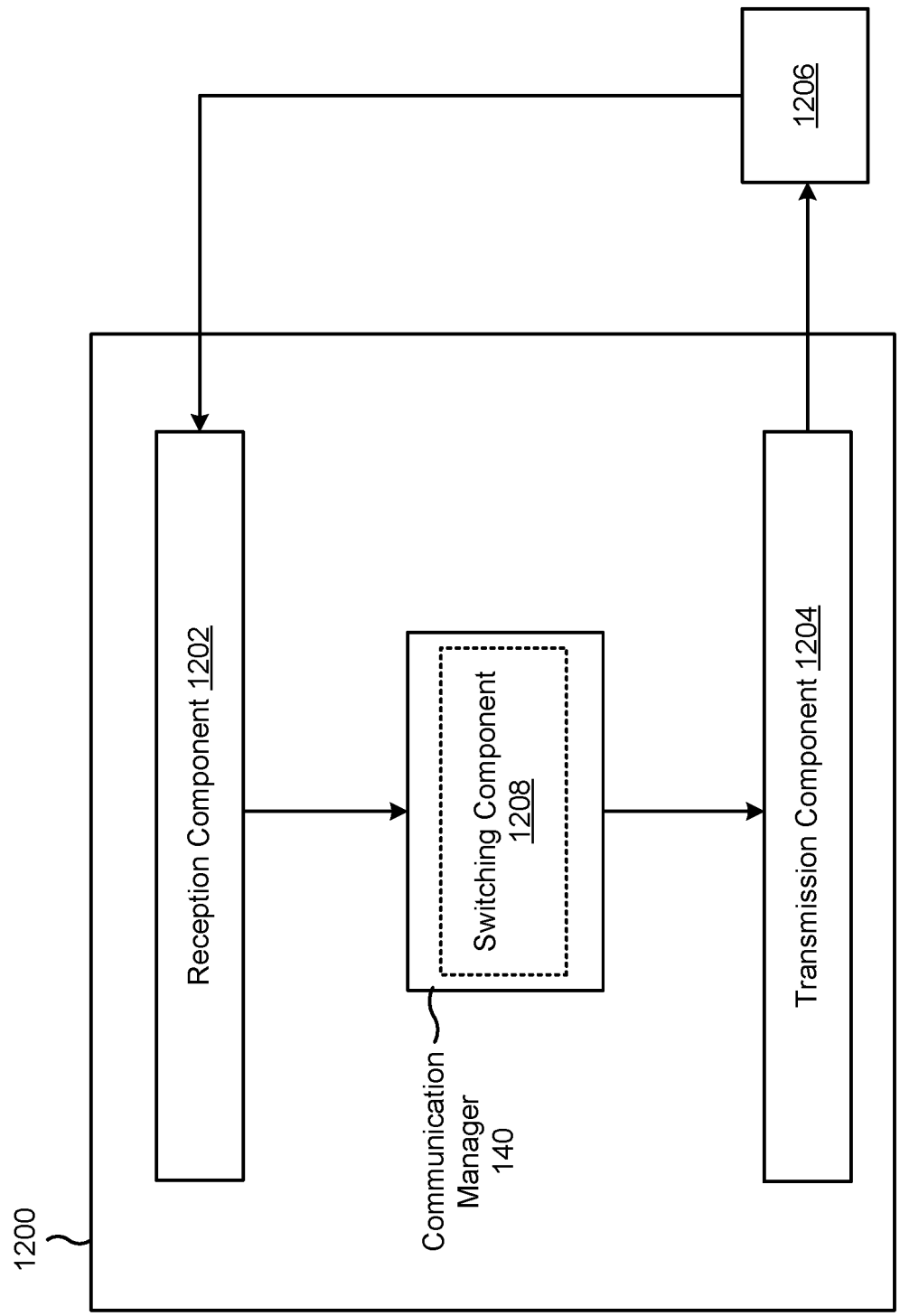
FIGS. 12 and 13 are diagrams of example apparatuses for wireless communication, in accordance with the present disclosure.

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include a switching component 1208, among other examples.

In some aspects, the apparatus 1200 may be configured to perform one or more operations described herein in connection with FIGS. 3-7. Additionally, or alternatively, the apparatus 1200 may be configured to perform one or more processes described herein, such as process 800 of FIG. 8, process 900 of FIG. 9, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

In some aspects, the reception component 1202 may receive (e.g., from the apparatus 1206, such as a base station) an indication of a first CFR within a BWP and a second CFR for MBS within the BWP. Accordingly, the reception component 1202 may receive, using a first numerology, a non-group-common communication at least partially in the BWP. Additionally, the reception component 1202 may receive, using the first numerology, a group-common communication at least partially in the first CFR. The reception component 1202 may further receive, using a second numerology, a group-common communication at least partially in the second CFR. For example, the switching component 1208 may switch to the second CFR after receiving the non-group-common communication in the BWP or the group-common communication in the first CFR. The switching component 1208 may include one or more antennas, a modem, a demodulator, a MIMO detector, a receive processor, a controller/processor, a memory, or a combination thereof, of the UE described in connection with FIG. 2.

In some aspects, the reception component 1202 may receive an indication of a first set of slots associated with the first numerology and a second set of slots associated with the second numerology. Accordingly, the non-group-common communication is received in at least one slot of the first set of slots, the group-common communication in the first CFR is received in at least one slot of the first set of slots, and the group-common communication in the second CFR is received in at least one slot of the second set of slots. As an alternative, the reception component 1202 may receive an indication of a priority associated with an additional group-common communication at least partially in the first CFR and a priority associated with an additional group-common communication at least partially in the second CFR. Accordingly, the reception component 1202 may receive the additional group-common communication at least partially in the first CFR or the additional group-common communication at least partially in the second CFR based at least in part on the priorities, where the additional group-common communication at least partially in the first CFR and the additional group-common communication at least partially in the second CFR overlap within a same slot.

As an alternative, the reception component 1202 may receive (e.g., from the apparatus 1206, such as a base station) an indication of a CFR within a BWP. Accordingly, the reception component 1202 may receive, using a first numerology, a non-group-common communication in the BWP. Additionally, the reception component 1202 may receive, using the first numerology, a first group-common communication in the CFR. Additionally, the reception component 1202 may receive, using a second numerology, a second group-common communication in the CFR. For example, the switching component 1208 may switch to the second numerology to monitor for scheduling information associated with the second group-common communication. Alternatively, the switching component 1208 may switch to the second numerology based on the reception component 1202 receiving scheduling information associated with the second group-common communication that indicates the second numerology.

In some aspects, the reception component 1202 may receive an indication of a first set of slots associated with the first numerology and a second set of slots associated with the second numerology, such that the non-group-common communication is received in at least one slot of the first set of slots, the first group-common communication is received in at least one slot of the first set of slots, and the second group-common communication is received in at least one slot of the second set of slots. As an alternative, the reception component 1202 may receive an indication of a priority associated with a third group-common communication and a priority associated with a fourth group-common communication. Accordingly, the reception component 1202 may receive the third group-common communication or the fourth group-common communication based at least in part on the priorities, where the third group-common communication and the fourth group-common communication overlap within a same slot.

In some aspects, the reception component 1202 may receive a retransmission of the second group-common communication. The retransmission may be received as a multicast transmission using the second numerology, as a multicast transmission using the first numerology, or as a unicast transmission using the first numerology.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
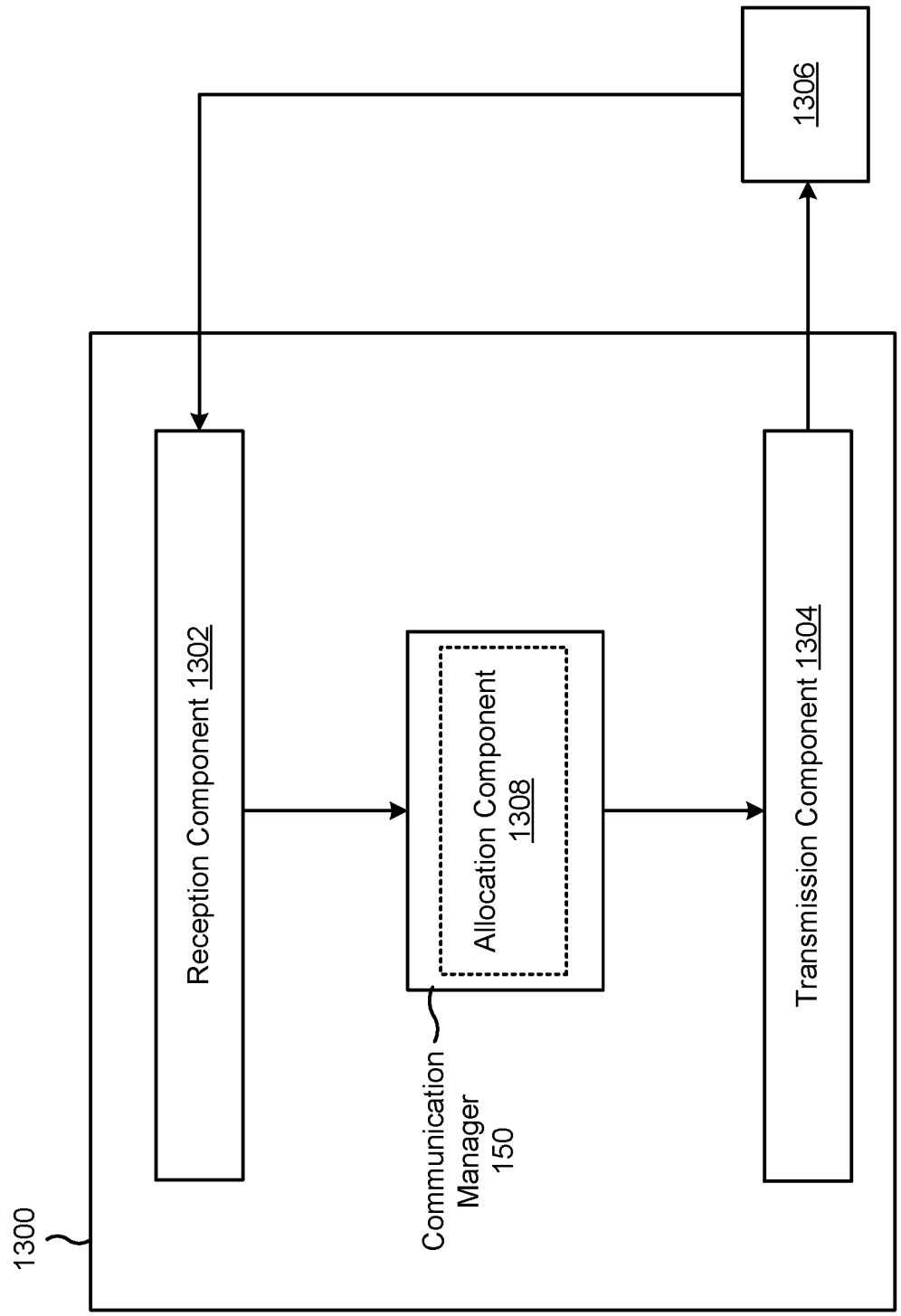

FIG. 13 is a diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150. The communication manager 150 may include an allocation component 1308, among other examples.

In some aspects, the apparatus 1300 may be configured to perform one or more operations described herein in connection with FIGS. 3-7. Additionally, or alternatively, the apparatus 1300 may be configured to perform one or more processes described herein, such as process 1000 of FIG. 10, process 1100 of FIG. 11, or a combination thereof. In some aspects, the apparatus 1300 and/or one or more components shown in FIG. 13 may include one or more components of the base station described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the base station described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the base station described in connection with FIG. 2. In some aspects, the transmission component 1304 may be co-located with the reception component 1302 in a transceiver.

In some aspects, the transmission component 1304 may transmit (e.g., to the apparatus 1306, such as a UE) an indication of a first CFR within a BWP and a second CFR for MBS within the BWP. For example, the allocation component 1308 may assign the first CFR to a first numerology and the second CFR to a second numerology. The allocation component 1308 may include a modem, a modulator, a transmit MIMO processor, a transmit processor, a controller/processor, a memory, or a combination thereof, of the base station described in connection with FIG. 2. Accordingly, the transmission component 1304 may transmit, using the first numerology, a non-group-common communication at least partially in the BWP. Additionally, the transmission component 1304 may transmit, using the first numerology, a group-common communication at least partially in the first CFR. Additionally, the transmission component 1304 may transmit, using the second numerology, a group-common communication at least partially in the second CFR.

In some aspects, the transmission component 1304 may transmit an indication of a first set of slots associated with the first numerology and a second set of slots associated with the second numerology, where the non-group-common communication is transmitted in at least one slot of the first set of slots, the group-common communication in the first CFR is transmitted in at least one slot of the first set of slots, and the group-common communication in the second CFR is transmitted in at least one slot of the second set of slots. As an alternative, the transmission component 1304 may transmit an indication of a priority associated with an additional group-common communication at least partially in the first CFR and a priority associated with an additional group-common communication at least partially in the second CFR, where the additional group-common communication at least partially in the first CFR and the additional group-common communication at least partially in the second CFR overlap within a same slot.

As an alternative, the transmission component 1304 may transmit (e.g., to the apparatus 1306, such as a UE) an indication of a CFR within a BWP. For example, the allocation component 1308 may assign the CFR to a first numerology and a second numerology. Accordingly, the transmission component 1304 may transmit, using the first numerology, a non-group-common communication in the BWP. Additionally, the transmission component 1304 may transmit, using the first numerology, a first group-common communication in the CFR. Additionally, the transmission component 1304 may transmit, using the second numerology, a second group-common communication in the CFR.

In some aspects, the transmission component 1304 may transmit an indication of a first set of slots associated with the first numerology and a second set of slots associated with the second numerology, where the non-group-common communication is transmitted in at least one slot of the first set of slots, the first group-common communication is transmitted in at least one slot of the first set of slots, and the second group-common communication is transmitted in at least one slot of the second set of slots. As an alternative, the transmission component 1304 may transmit an indication of a priority associated with a third group-common communication and a priority associated with a fourth group-common communication, where the third group-common communication and the fourth group-common communication overlap within a same slot.

In some aspects, the transmission component 1304 may further transmit a retransmission of the second group-common communication. The retransmission is transmitted as a multicast transmission using the second numerology, as a multicast transmission using the first numerology, or as a unicast transmission using the first numerology.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving, from a base station, an indication of a first common frequency resource (CFR) within a bandwidth part (BWP) and a second CFR for multicast/broadcast service (MBS) within the BWP; receiving, using a first numerology, a non-group-common communication at least partially in the BWP; receiving, using the first numerology, a group-common communication at least partially in the first CFR; and receiving, using a second numerology, a group-common communication at least partially in the second CFR.

Aspect 2: The method of Aspect 1, wherein the first numerology is associated with a normal cyclic prefix (NCP), and the second numerology is associated with an extended cyclic prefix (ECP).

Aspect 3: The method of any of Aspects 1 through 2, wherein the first numerology is associated with a subcarrier spacing (SCS) that is different than an SCS associated with the second numerology.

Aspect 4: The method of any of Aspects 1 through 3, further comprising: receiving, from the base station, an indication of a first set of slots associated with the first numerology and a second set of slots associated with the second numerology, wherein the non-group-common communication is received in at least one slot of the first set of slots, the group-common communication is received in at least one slot of the first set of slots and the group-common communication is received in at least one slot of the second set of slots.

Aspect 5: The method of any of Aspects 1 through 3, further comprising: receiving, from the base station, an indication of a priority associated with an additional group-common communication at least partially in the first CFR and a priority associated with an additional group-common communication at least partially in the second CFR; and receiving the additional group-common communication at least partially in the first CFR or the additional group-common communication at least partially in the second CFR based at least in part on the priorities, wherein the additional group-common communication at least partially in the first CFR and the additional group-common communication at least partially in the second CFR overlap within a same slot.

Aspect 6: A method of wireless communication performed by a user equipment (UE), comprising: receiving, from a base station, an indication of a common frequency resource (CFR) within a bandwidth part (BWP); receiving, using a first numerology, a non-group-common communication in the BWP; receiving, using the first numerology, a first group-common communication in the CFR; and receiving, using a second numerology, a second group-common communication in the CFR.

Aspect 7: The method of Aspect 6, further comprising: receiving, from the base station, an indication of a first set of slots associated with the first numerology and a second set of slots associated with the second numerology, wherein the non-group-common communication is received in at least one slot of the first set of slots, the first group-common communication is received in at least one slot of the first set of slots, and the second group-common communication is received in at least one slot of the second set of slots.

Aspect 8: The method of Aspect 6, further comprising: receiving, from the base station, an indication of a priority associated with a third group-common communication and a priority associated with a fourth group-common communication; and receiving the third group-common communication or the fourth group-common communication based at least in part on the priorities, wherein the third group-common communication and the fourth group-common communication overlap within a same slot.

Aspect 9: The method of any of Aspects 6 through 8, wherein the indication includes a control resource set (CORESET) and search space configuration associated with both the first numerology and the second numerology and an indicator of the second numerology.

Aspect 10: The method of any of Aspects 6 through 8, wherein the indication includes a first control resource set (CORESET) and search space configuration associated with the first numerology, and a second CORESET and search space configuration associated with the second numerology.

Aspect 11: The method of any of Aspects 6 through 10, wherein the first group-common communication includes scheduling information received using the first numerology, and the second group-common communication includes scheduling information received using the second numerology.

Aspect 12: The method of any of Aspects 6 through 10, wherein the first group-common communication is scheduled according to first scheduling information received using the first numerology, and the second group-common communication is scheduled according to second scheduling information received using the first numerology.

Aspect 13: The method of Aspect 12, wherein the second scheduling information includes an indication of the second numerology.

Aspect 14: The method of any of Aspects 12 through 13, wherein the second scheduling information is scrambled using a radio network temporary identifier (RNTI) associated with the second numerology.

Aspect 15: The method of Aspect 12, wherein the second scheduling information includes activation downlink control information (DCI) for semi-persistent scheduling (SPS) and includes an indication of an SPS configuration associated with the second numerology.

Aspect 16: The method of any of Aspects 12 through 15, wherein the second group-common communication is received after at least a minimum time gap has elapsed since the second scheduling information was received.

Aspect 17: The method of any of Aspects 12 through 15, wherein the second group-common communication is received after less than a minimum time gap has elapsed since the second scheduling information was received, and the second numerology is associated with a default configuration.

Aspect 18: The method of Aspect 17, wherein the second group-common communication is received using a default transmission configuration indicator (TCI) state.

Aspect 19: The method of any of Aspects 6 through 18, further comprising: receiving, from the base station, a retransmission of the second group-common communication, wherein the retransmission is received as a multicast transmission using the second numerology.

Aspect 20: The method of any of Aspects 6 through 18, further comprising: receiving, from the base station, a retransmission of the second group-common communication, wherein the retransmission is received as a multicast transmission using the first numerology.

Aspect 21: The method of any of Aspects 6 through 18, further comprising: receiving, from the base station, a retransmission of the second group-common communication, wherein the retransmission is received as a unicast transmission using the first numerology.

Aspect 22: A method of wireless communication performed by a base station, comprising: transmitting, to a user equipment (UE), an indication of a first common frequency resource (CFR) within a bandwidth part (BWP) and a second CFR for multicast/broadcast service (MBS) within the BWP; transmitting, using a first numerology, a non-group-common communication at least partially in the BWP; and transmitting, using the first numerology, a group-common communication at least partially in the first CFR; and transmitting, using a second numerology, a group-common communication at least partially in the second CFR.

Aspect 23: The method of Aspect 22, wherein the first numerology is associated with a normal cyclic prefix (NCP), and the second numerology is associated with an extended cyclic prefix (ECP).

Aspect 24: The method of any of Aspects 22 through 23, wherein the first numerology is associated with a subcarrier spacing (SCS) that is different than an SCS associated with the second numerology.

Aspect 25: The method of any of Aspects 22 through 24, further comprising: transmitting, to the UE, an indication of a first set of slots associated with the first numerology and a second set of slots associated with the second numerology, wherein the non-group-common communication is transmitted in at least one slot of the first set of slots, the group-common communication is transmitted in at least one slot of the first set of slots, and the group-common communication is transmitted in at least one slot of the second set of slots.

Aspect 26: The method of any of Aspects 22 through 24, further comprising: transmitting, to the UE, an indication of a priority associated with an additional group-common communication at least partially in the first CFR and a priority associated with an additional group-common communication at least partially in the second CFR, wherein the additional group-common communication at least partially in the first CFR and the additional group-common communication at least partially in the second CFR overlap within a same slot.

Aspect 27: A method of wireless communication performed by a base station, comprising: transmitting, to a user equipment (UE), an indication of a common frequency resource (CFR) within a bandwidth part (BWP); transmitting, using a first numerology, a non-group-common communication in the BWP; transmitting, using the first numerology, a first group-common communication in the CFR; and transmitting, using a second numerology, a second group-common communication in the CFR.

Aspect 28: The method of Aspect 27, further comprising: transmitting, to the UE, an indication of a first set of slots associated with the first numerology and a second set of slots associated with the second numerology, wherein the non-group-common communication is transmitted in at least one slot of the first set of slots, the first group-common communication is transmitted in at least one slot of the first set of slots, and the second group-common communication is transmitted in at least one slot of the second set of slots.

Aspect 29: The method of Aspect 27, further comprising: transmitting, to the UE, an indication of a priority associated with a third group-common communication and a priority associated with a fourth group-common communication, wherein the third group-common communication and the fourth group-common communication overlap within a same slot.

Aspect 30: The method of any of Aspects 27 through 29, wherein the indication includes a control resource set (CORESET) and search space configuration associated with both the first numerology and the second numerology and an indicator of the second numerology.

Aspect 31: The method of any of Aspects 27 through 29, wherein the indication includes a first control resource set (CORESET) and search space configuration associated with the first numerology, and a second CORESET and search space configuration associated with the second numerology.

Aspect 32: The method of any of Aspects 27 through 31, wherein the first group-common communication includes scheduling information received using the first numerology, and the second group-common communication includes scheduling information received using the second numerology.

Aspect 33: The method of any of Aspects 27 through 31, wherein the first group-common communication is scheduled according to first scheduling information received using the first numerology, and the second group-common communication is scheduled according to second scheduling information received using the first numerology.

Aspect 34: The method of Aspect 33, wherein the second scheduling information includes an indication of the second numerology.

Aspect 35: The method of any of Aspects 33 through 34, wherein the second scheduling information is scrambled using a radio network temporary identifier (RNTI) associated with the second numerology.

Aspect 36: The method of Aspect 33, wherein the second scheduling information includes activation downlink control information (DCI) for semi-persistent scheduling (SPS) and includes an indication of an SPS configuration associated with the second numerology.

Aspect 37: The method of any of Aspects 33 through 36, wherein the second group-common communication is transmitted after at least a minimum time gap has elapsed since the second scheduling information was received.

Aspect 38: The method of any of Aspects 33 through 36, wherein the second group-common communication is transmitted after less than a minimum time gap has elapsed since the second scheduling information was received, and the second numerology is associated with a default configuration.

Aspect 39: The method of Aspect 38, wherein the second group-common communication is transmitted using a default transmission configuration indicator (TCI) state.

Aspect 40: The method of any of Aspects 27 through 39, further comprising: transmitting, to the UE, a retransmission of the second group-common communication, wherein the retransmission is transmitted as a multicast transmission using the second numerology.

Aspect 41: The method of any of Aspects 27 through 39, further comprising: transmitting, to the UE, a retransmission of the second group-common communication, wherein the retransmission is transmitted as a multicast transmission using the first numerology.

Aspect 42: The method of any of Aspects 27 through 39, further comprising: transmitting, to the UE, a retransmission of the second group-common communication, wherein the retransmission is transmitted as a unicast transmission using the first numerology.

Aspect 43: An apparatus for wireless communication at a device, comprising a processor; memory coupled with the processor; and instructions stored in the memory and executable by the processor to cause the apparatus to perform the method of one or more of Aspects 1-5.

Aspect 44: A device for wireless communication, comprising a memory and one or more processors coupled to the memory, the one or more processors configured to perform the method of one or more of Aspects 1-5.

Aspect 45: An apparatus for wireless communication, comprising at least one means for performing the method of one or more of Aspects 1-5.

Aspect 46: A non-transitory computer-readable medium storing code for wireless communication, the code comprising instructions executable by a processor to perform the method of one or more of Aspects 1-5.

Aspect 47: A non-transitory computer-readable medium storing a set of instructions for wireless communication, the set of instructions comprising one or more instructions that, when executed by one or more processors of a device, cause the device to perform the method of one or more of Aspects 1-5.

Aspect 48: An apparatus for wireless communication at a device, comprising a processor; memory coupled with the processor; and instructions stored in the memory and executable by the processor to cause the apparatus to perform the method of one or more of Aspects 6-21.

Aspect 49: A device for wireless communication, comprising a memory and one or more processors coupled to the memory, the one or more processors configured to perform the method of one or more of Aspects 6-21.

Aspect 50: An apparatus for wireless communication, comprising at least one means for performing the method of one or more of Aspects 6-21.

Aspect 51: A non-transitory computer-readable medium storing code for wireless communication, the code comprising instructions executable by a processor to perform the method of one or more of Aspects 6-21.

Aspect 52: A non-transitory computer-readable medium storing a set of instructions for wireless communication, the set of instructions comprising one or more instructions that, when executed by one or more processors of a device, cause the device to perform the method of one or more of Aspects 6-21.

Aspect 53: An apparatus for wireless communication at a device, comprising a processor; memory coupled with the processor; and instructions stored in the memory and executable by the processor to cause the apparatus to perform the method of one or more of Aspects 22-26.

Aspect 54: A device for wireless communication, comprising a memory and one or more processors coupled to the memory, the one or more processors configured to perform the method of one or more of Aspects 22-26.

Aspect 55: An apparatus for wireless communication, comprising at least one means for performing the method of one or more of Aspects 22-26.

Aspect 56: A non-transitory computer-readable medium storing code for wireless communication, the code comprising instructions executable by a processor to perform the method of one or more of Aspects 22-26.

Aspect 57: A non-transitory computer-readable medium storing a set of instructions for wireless communication, the set of instructions comprising one or more instructions that, when executed by one or more processors of a device, cause the device to perform the method of one or more of Aspects 22-26.

Aspect 58: An apparatus for wireless communication at a device, comprising a processor; memory coupled with the processor; and instructions stored in the memory and executable by the processor to cause the apparatus to perform the method of one or more of Aspects 27-42.

Aspect 59: A device for wireless communication, comprising a memory and one or more processors coupled to the memory, the one or more processors configured to perform the method of one or more of Aspects 27-42.

Aspect 60: An apparatus for wireless communication, comprising at least one means for performing the method of one or more of Aspects 27-42.

Aspect 61: A non-transitory computer-readable medium storing code for wireless communication, the code comprising instructions executable by a processor to perform the method of one or more of Aspects 27-42.

Aspect 62: A non-transitory computer-readable medium storing a set of instructions for wireless communication, the set of instructions comprising one or more instructions that, when executed by one or more processors of a device, cause the device to perform the method of one or more of Aspects 27-42.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
   receive an indication of a first common frequency resource (CFR) within a bandwidth part (BWP) and a second CFR for multicast/broadcast service (MBS) within the BWP;
   receive, using a first numerology, a non-group-common communication at least partially in the BWP;
   receive, using the first numerology, a group-common communication at least partially in the first CFR;

receive, using a second numerology, a group-common communication at least partially in the second CFR; and at least one of:

receive an indication of a first set of slots associated with the first numerology and a second set of slots associated with the second numerology, wherein the non-group-common communication is received in at least one slot of the first set of slots, the group-common communication in the first CFR is received in at least one slot of the first set of slots, and the group-common communication in the second CFR is received in at least one slot of the second set of slots, or receive an indication of a priority associated with an additional group-common communication at least partially in the first CFR and a priority associated with the additional group-common communication at least partially in the second CFR, wherein the additional group-common communication at least partially in the first CFR and the additional group-common communication at least partially in the second CFR overlap within a same slot.

2. The apparatus of claim 1, wherein the first numerology is associated with a normal cyclic prefix (NCP), and the second numerology is associated with an extended cyclic prefix (ECP).

3. The apparatus of claim 1, wherein the first numerology is associated with a subcarrier spacing (SCS) that is different than an SCS associated with the second numerology.

4. The apparatus of claim 1, wherein the one or more processors are further configured to:

receive the indication of the first set of slots and the second set of slots, wherein the non-group-common communication is received in the at least one slot of the first set of slots, the group-common communication in the first CFR is received in the at least one slot of the first set of slots, and the group-common communication in the second CFR is received in the at least one slot of the second set of slots.

5. The apparatus of claim 1, wherein the one or more processors are further configured to:

receive the indication of the priority associated with the additional group-common communication at least partially in the first CFR and the priority associated with the additional group-common communication at least partially in the second CFR; and receive the additional group-common communication at least partially in the first CFR, or the additional group-common communication at least partially in the second CFR, based at least in part on the priority associated with the additional group-common communication at least partially in the first CFR and the priority associated with an additional group-common communication at least partially in the second CFR, wherein the additional group-common communication at least partially in the first CFR and the additional group-common communication at least partially in the second CFR overlap within the same slot.

6. An apparatus for wireless communication at a user equipment (UE), comprising:

one or more memories; and one or more processors, coupled to the one or more memories, configured to:

receive an indication of a common frequency resource (CFR) within a bandwidth part (BWP);

receive, using a first numerology, a non-group-common communication in the BWP;

receive, using the first numerology, a first group-common communication in the CFR; and receive, using a second numerology, a second group-common communication in the CFR, wherein at least one of:

the one or more processors are further configured to at least one of:

receive an indication of a first set of slots associated with the first numerology and a second set of slots associated with the second numerology, wherein the non-group-common communication is received in at least one slot of the first set of slots, the first group-common communication is received in at least one slot of the first set of slots, and the second group-common communication is received in at least one slot of the second set of slots, or receive an indication of a priority associated with a third group-common communication and a priority associated with a fourth group-common communication, wherein the third group-common communication and the fourth group-common communication overlap within a same slot, the indication of the CFR includes a first control resource set (CORESET) and search space configuration associated with both the first numerology and the second numerology and an indicator of the second numerology, or the indication of the CFR includes a second CORESET) and search space configuration associated with the first numerology, and a third CORESET and search space configuration associated with the second numerology.

7. The apparatus of claim 6, wherein the one or more processors are further configured to:

receive the indication of the first set of slots and the second set of slots, wherein the non-group-common communication is received in the at least one slot of the first set of slots, the first group-common communication is received in the at least one slot of the first set of slots, and the second group-common communication is received in the at least one slot of the second set of slots.

8. The apparatus of claim 6, wherein the one or more processors are further configured to:

receive the indication of the priority associated with the third group-common communication and the priority associated with the fourth group-common communication; and receive the third group-common communication, or the fourth group-common communication, based at least in part on the priority associated with the third group-common communication and the priority associated with fourth third group-common communication, wherein the third group-common communication and the fourth group-common communication overlap within the same slot.

9. The apparatus of claim 6, wherein the indication of the CFR includes a first control resource set (CORESET) and search space configuration associated with both the first numerology and the second numerology and an indicator of the second numerology.

10. The apparatus of claim 6, wherein the indication of the CFR includes a second control resource set (CORESET) and search space configuration associated with the first numerology, and a third CORESET and search space configuration associated with the second numerology.

11. The apparatus of claim 6, wherein the first group-common communication includes scheduling information received using the first numerology, and the second group-common communication includes scheduling information received using the second numerology.

12. The apparatus of claim 6, wherein the first group-common communication is scheduled according to first scheduling information received using the first numerology, and the second group-common communication is scheduled according to second scheduling information received using the first numerology.

13. The apparatus of claim 12, wherein the second scheduling information includes an indication of the second numerology.

14. The apparatus of claim 12, wherein the second scheduling information is scrambled using a radio network temporary identifier (RNTI) associated with the second numerology.

15. The apparatus of claim 12, wherein the second scheduling information includes activation downlink control information (DCI) for semi-persistent scheduling (SPS) and includes an indication of an SPS configuration associated with the second numerology.

16. The apparatus of claim 12, wherein the second group-common communication is received after at least a minimum time gap has elapsed since the second scheduling information was received.

17. The apparatus of claim 12, wherein the second group-common communication is received after less than a minimum time gap has elapsed since the second scheduling information was received, and the second numerology is associated with a default configuration.

18. The apparatus of claim 17, wherein the second group-common communication is received using a default transmission configuration indicator (TCI) state.

19. The apparatus of claim 6, wherein the one or more processors are further configured to:
receive a retransmission of the second group-common communication,
wherein the retransmission is received as a multicast transmission using the second numerology.

20. The apparatus of claim 6, wherein the one or more processors are further configured to:
receive a retransmission of the second group-common communication,
wherein the retransmission is received as a multicast transmission using the first numerology.

21. The apparatus of claim 6, wherein the one or more processors are further configured to:
receive a retransmission of the second group-common communication,
wherein the retransmission is received as a unicast transmission using the first numerology.

22. An apparatus for wireless communication at a network entity, comprising:
one or more memories; and
one or more processors, coupled to the one or more memories, configured to:
transmit, to a user equipment (UE), an indication of a first common frequency resource (CFR) within a bandwidth part (BWP) and a second CFR for multicast/broadcast service (MBS) within the BWP;
transmit, using a first numerology, a non-group-common communication at least partially in the BWP;
transmit, using the first numerology, a group-common communication at least partially in the first CFR;
transmit, using a second numerology, a group-common communication at least partially in the second CFR; and
at least one of:
transmit, to the UE, an indication of a first set of slots associated with the first numerology and a second set of slots associated with the second numerology, wherein the non-group-common communication is transmitted in at least one slot of the first set of slots, the group-common communication in the first CFR is received in at least one slot of the first set of slots, and the group-common communication in the second CFR is received in at least one slot of the second set of slots, or
transmit, to the UE, an indication of a priority associated with an additional group-common communication at least partially in the first CFR and a priority associated with the additional group-common communication at least partially in the second CFR, wherein the additional group-common communication at least partially in the first CFR and the additional group-common communication at least partially in the second CFR overlap within a same slot.

23. The apparatus of claim 22, wherein the first numerology is associated with a normal cyclic prefix (NCP), and the second numerology is associated with an extended cyclic prefix (ECP).

24. The apparatus of claim 22, wherein the first numerology is associated with a subcarrier spacing (SCS) that is different than an SCS associated with the second numerology.

25. The apparatus of claim 22, wherein the one or more processors are further configured to:
transmit, to the UE, the indication of the first set of slots and the second set of slots,
wherein the non-group-common communication is transmitted in the at least one slot of the first set of slots, the group-common communication in the first CFR is transmitted in the at least one slot of the first set of slots, and the group-common communication in the second CFR is transmitted in the at least one slot of the second set of slots.

26. The apparatus of claim 22, wherein the one or more processors are further configured to:
transmit, to the UE, the indication of the priority associated with the additional group-common communication at least partially in the first CFR and the priority associated with the additional group-common communication at least partially in the second CFR,
wherein the additional group-common communication at least partially in the first CFR and the additional group-common communication at least partially in the second CFR overlap within the same slot.

27. An apparatus for wireless communication at a network entity, comprising:
one or more memories; and
one or more processors, coupled to the one or more memories, configured to:
transmit, to a user equipment (UE), an indication of a common frequency resource (CFR) within a bandwidth part (BWP);
transmit, using a first numerology, a non-group-common communication in the BWP;

transmit, using the first numerology, a first group-common communication in the CFR; and
transmit, using a second numerology, a second group-common communication in the CFR,
wherein at least one of:
the one or more processors are further configured to at least one of:
transmit, to the UE, an indication of a first set of slots associated with the first numerology and a second set of slots associated with the second numerology, wherein the non-group-common communication is transmitted in at least one slot of the first set of slots, the first group-common communication is transmitted in at least one slot of the first set of slots, and the second group-common communication is transmitted in at least one slot of the second set of slots, or
transmit, to the UE, an indication of a priority associated with a third group-common communication and a priority associated with a fourth group-common communication, wherein the third group-common communication and the fourth group-common communication overlap within a same slot,
the indication of the CFR includes a first control resource set (CORESET) and search space configuration associated with both the first numerology and the second numerology and an indicator of the second numerology, or
the indication of the CFR includes a second CORESET and search space configuration associated with the first numerology, and a third CORESET and search space configuration associated with the second numerology.

28. The apparatus of claim 27, wherein the one or more processors are further configured to:
transmit, to the UE, the indication of the priority associated with the third group-common communication and the priority associated with the fourth group-common communication,
wherein the third group-common communication and the fourth group-common communication overlap within the same slot.

29. The apparatus of claim 27, wherein the one or more processors are further configured to:
transmit, to the UE, the indication of the first set of slots and the second set of slots,
wherein the non-group-common communication is transmitted in the at least one slot of the first set of slots, the first group-common communication is transmitted in the at least one slot of the first set of slots, and the second group-common communication is transmitted in the at least one slot of the second set of slots.

30. The apparatus of claim 27, wherein the one or more processors are further configured to:
receive a retransmission of the second group-common communication,
wherein the retransmission is received as a multicast transmission using the second numerology, a multicast transmission using the first numerology, or a unicast transmission using the first numerology.

* * * * *